US011968698B2

(12) United States Patent
Zewail et al.

(10) Patent No.: US 11,968,698 B2
(45) Date of Patent: Apr. 23, 2024

(54) RATE-MATCHING SHARED CHANNEL RESOURCES AROUND CONTROL CHANNELS FOR MULTIPLE USERS IN A CONTROL RESOURCE SET

(71) Applicant: QUALCOMM Incorporated, San Diego, CA (US)

(72) Inventors: Ahmed Abdelaziz Ibrahim Abdelaziz Zewail, San Diego, CA (US); Qiang Wu, San Diego, CA (US); Jing Sun, San Diego, CA (US); Xiaoxia Zhang, San Diego, CA (US); Tao Luo, San Diego, CA (US); Iyab Issam Sakhnini, San Diego, CA (US); Jun Ma, San Diego, CA (US); Mehmet Izzet Gurelli, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/241,831

(22) Filed: Apr. 27, 2021

(65) Prior Publication Data
US 2021/0345341 A1 Nov. 4, 2021

Related U.S. Application Data

(60) Provisional application No. 63/019,850, filed on May 4, 2020.

(51) Int. Cl.
*H04W 72/53* (2023.01)
*H04L 1/00* (2006.01)
(Continued)

(52) U.S. Cl.
CPC ........... *H04W 72/53* (2023.01); *H04L 1/0068* (2013.01); *H04L 1/1614* (2013.01); *H04W 72/0446* (2013.01); *H04W 72/23* (2023.01)

(58) Field of Classification Search
CPC ........... H04W 72/0493; H04W 72/042; H04W 72/0446; H04W 72/1289; H04L 1/0068; H04L 1/1614; H04L 5/0053; H04L 1/1887
(Continued)

(56) References Cited

U.S. PATENT DOCUMENTS

2012/0063350 A1* 3/2012 Kim ...................... H04L 5/0007
370/252
2012/0155362 A1* 6/2012 Montojo ................ H04H 20/71
370/312
(Continued)

*Primary Examiner* — Hassan Kizou
*Assistant Examiner* — Oladiran Gideon Olaleye
(74) *Attorney, Agent, or Firm* — Holland & Hart LLP

(57) ABSTRACT

Methods, systems, and devices for wireless communications are described in which control resources may be identified, and a data transmission may be rate-matched around the one or more control channels of multiple UEs or at multiple aggregation levels in the control resources. A user equipment (UE) may identify a search space for a first control channel, and the rate-matching of the data transmission may be performed based on a location of the search space in the control resources. In some cases, a base station may provide a mapping of resources (e.g., a bitmap) within the control resources that are occupied, which may be used for rate-matching.

30 Claims, 23 Drawing Sheets

(51) Int. Cl.
*H04L 1/1607* (2023.01)
*H04W 72/0446* (2023.01)
*H04W 72/23* (2023.01)

(58) Field of Classification Search
USPC .......................................................... 370/329
See application file for complete search history.

(56) References Cited

U.S. PATENT DOCUMENTS

| | | | |
|---|---|---|---|
| 2012/0230266 A1* | 9/2012 | Xie | H04L 5/0053 |
| | | | 370/329 |
| 2012/0263134 A1* | 10/2012 | Malladi | H04W 72/042 |
| | | | 370/329 |
| 2013/0194931 A1* | 8/2013 | Lee | H04W 72/04 |
| | | | 370/329 |
| 2014/0204849 A1* | 7/2014 | Chen | H04L 5/0053 |
| | | | 370/329 |
| 2017/0230154 A1* | 8/2017 | Tavildar | H04L 5/0046 |
| 2018/0175983 A1* | 6/2018 | Yum | H04L 5/0048 |
| 2018/0227156 A1* | 8/2018 | Papasakellariou | H04W 72/042 |
| 2018/0324018 A1* | 11/2018 | Hosseini | H04W 72/042 |
| 2019/0007961 A1* | 1/2019 | John Wilson | H04W 52/0216 |
| 2019/0069314 A1* | 2/2019 | Takeda | H04W 72/046 |
| 2019/0104435 A1* | 4/2019 | Cho | H04W 74/0833 |
| 2019/0110280 A1* | 4/2019 | Akkarakaran | H04L 5/0048 |
| 2019/0150124 A1* | 5/2019 | Nogami | H04L 5/0044 |
| | | | 370/330 |
| 2019/0182826 A1* | 6/2019 | Yerramalli | H04W 72/0413 |
| 2019/0222400 A1* | 7/2019 | Bagheri | H04L 5/0082 |
| 2019/0223164 A1* | 7/2019 | He | H04W 72/042 |
| 2019/0363824 A1* | 11/2019 | Sun | H04L 1/1887 |
| 2020/0022168 A1* | 1/2020 | Xu | H04L 5/0051 |
| 2021/0243680 A1* | 8/2021 | Harada | H04L 27/261 |

\* cited by examiner

RATE-MATCHING SHARED CHANNEL RESOURCES AROUND CONTROL CHANNELS FOR MULTIPLE USERS IN A CONTROL RESOURCE SET

CROSS REFERENCE

The present Application for Patent claims the benefit of U.S. Provisional Patent Application No. 63/019,850 by Zewail et al., entitled "RATE-MATCHING SHARED CHANNEL RESOURCES AROUND CONTROL CHANNELS FOR MULTIPLE USERS IN A CONTROL RESOURCE SET," filed May 4, 2020, assigned to the assignee hereof, and expressly incorporated by reference herein.

FIELD OF TECHNOLOGY

The following relates generally to wireless communications and more specifically to rate-matching shared channel resources around control channels for multiple users in a control resource set.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may provide control information to a UE that indicates a resource allocation for a data transmission to the UE (e.g., a physical downlink shared channel (PDSCH) allocation). The UE may receive the control information, identify the associated resource allocation, and process the data transmission in accordance with the resource allocation (e.g., by demodulating and decoding signals received in the resource allocation to the UE). Efficient techniques for providing control information and data transmissions may be desirable in order to enhance system operation and throughput.

SUMMARY

The described techniques relate to improved methods, systems, devices, and apparatuses that support rate-matching shared channel resources around control channels for multiple users in a control resource set. In accordance with various aspects, techniques provide for a number of control channels to be transmitted by a base station in configured control resources that may be monitored by a user equipment (UE). In some cases, a data transmission to the UE may be scheduled in a same time period (e.g., within a same slot) as an instance of the control resources (e.g., a control resource set (CORESET)). The control channels for a particular instance of the control resources may occupy less than all of the configured control resources.

In various aspects, in order to avoid underutilizing a portion of the control resources that are not occupied by the control channels, a data transmission (e.g., a physical downlink shared channel (PDSCH) transmission) may be rate-matched around the occupied control resources. In some cases, the control resources may include control channels for multiple UEs, may include control channels having multiple aggregation levels, or any combinations thereof. In some cases, the UE may identify a search space for a first control channel, and the rate-matching of the data transmission may be performed based on a location of the search space. In other cases, the base station may provide a mapping of resources (e.g., a bitmap) within the control resources that are occupied.

A method of wireless communication at a first UE is described. The method may include receiving a first downlink control channel on resources of a control resource set in time domain resources, where the first downlink control channel schedules a downlink shared channel in the time domain resources that overlaps with the resources of the control resource set in the time domain resources, determining, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE, and processing the downlink shared channel based on the downlink shared channel rate matching.

An apparatus for wireless communication at a first UE is described. The apparatus may include a processor, memory coupled with the processor, and instructions stored in the memory. The instructions may be executable by the processor to cause the apparatus to receive a first downlink control channel on resources of a control resource set in time domain resources, where the first downlink control channel schedules a downlink shared channel in the time domain resources that overlaps with the resources of the control resource set in the time domain resources, determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE, and process the downlink shared channel based on the downlink shared channel rate matching.

Another apparatus for wireless communication at a first UE is described. The apparatus may include means for receiving a first downlink control channel on resources of a control resource set in time domain resources, where the first downlink control channel schedules a downlink shared channel in the time domain resources that overlaps with the resources of the control resource set in the time domain resources, determining, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE, and processing the downlink shared channel based on the downlink shared channel rate matching.

A non-transitory computer-readable medium storing code for wireless communication at a first UE is described. The code may include instructions executable by a processor to receive a first downlink control channel on resources of a control resource set in time domain resources, where the first downlink control channel schedules a downlink shared channel in the time domain resources that overlaps with the resources of the control resource set in the time domain resources, determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE, and process the downlink shared channel based on the downlink shared channel rate matching.

In some examples of the method, apparatuses, and non-transitory computer-readable medium described herein, the determining may include operations, features, means, or instructions for identifying a set of search spaces within the control resource set, each of the set of search spaces having a corresponding search space index, identifying a first search space index associated with the first downlink control channel, and determining the subset of resources based on the first search space index. In some examples of the method, apparatuses, and non-transitory computer-readable medium described herein, the subset of resources includes a subset of the set of search spaces that have a search space index that is equal to or lower than the first search space index.

In some examples of the method, apparatuses, and non-transitory computer-readable medium described herein, the first downlink control channel and the second downlink control channel have different aggregation levels. In some examples of the method, apparatuses, and non-transitory computer-readable medium described herein, the determining further may include operations, features, means, or instructions for identifying a largest search space index of one or more search space indices of one or more downlink control channels for the first UE based on a lowest aggregation level of the different aggregation levels, and determining the subset of resources based on a number of search spaces having a lower search space index than the identified largest space index, and where the downlink shared channel is rate-matched around the subset of resources. In some examples of the method, apparatuses, and non-transitory computer-readable medium described herein, the determining further may include operations, features, means, or instructions for identifying a largest search space index of a set of search space indices for each of two or more different aggregation levels based on an indication provided in the first downlink control channel, and determining the subset of resources based on a number of search spaces at each of the two or more different aggregation levels having a search space index at or below the indicated largest search space index of each of the two or more different aggregation levels, and where the downlink shared channel is rate-matched around the subset of resources.

In some examples of the method, apparatuses, and non-transitory computer-readable medium described herein, the determining further may include operations, features, means, or instructions for receiving a bitmap that indicates portions of the control resource set that are included in the subset of resources. In some examples of the method, apparatuses, and non-transitory computer-readable medium described herein, the bitmap indicates resources that are available for the downlink shared channel or indicates resources that are unavailable for the downlink shared channel. In some examples of the method, apparatuses, and non-transitory computer-readable medium described herein, a resolution of each bit of the bitmap is based on a lowest aggregation level used for downlink control channel transmissions. In some examples of the method, apparatuses, and non-transitory computer-readable medium described herein, the bitmap omits resource locations of the first downlink control channel. Some examples of the method, apparatuses, and non-transitory computer-readable medium described herein may further include operations, features, means, or instructions for receiving configuration information that indicates one or more locations in the resources of the control resource set that are unavailable for the downlink shared channel, and where the bitmap omits the indicated one or more locations. Some examples of the method, apparatuses, and non-transitory computer-readable medium described two or more different UEs may be scheduled with downlink shared channels that overlap with the subset of resources, and where the bitmap is provided to each of the two or more different UEs for downlink shared channel rate-matching.

In some examples of the method, apparatuses, and non-transitory computer-readable medium described herein, the first downlink control channel includes an indication of whether one or more rate-matching information fields are provided to the first UE, and where the determining and the processing are performed based on the indication. Some examples of the method, apparatuses, and non-transitory computer-readable medium described herein may further include operations, features, means, or instructions for receiving, from a base station, configuration information that enables rate-matching around the subset of resources, or that disables rate-matching around the subset of resources.

In some examples of the method, apparatuses, and non-transitory computer-readable medium described herein, each of a set of search spaces within the control resource set may be mapped to a set of control channel elements (CCEs), and where an index for each search space is based on a function of at least one of: an aggregation level (AL), a CCE position of the search space within the control resource set, a time-based index, a UE index, a frequency-based index, or any combinations thereof.

A method of wireless communication at a base station is described. The method may include determining a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources, rate-matching the first downlink shared channel around the first subset of resources and the second subset of resources, and transmitting the first downlink control channel to the first UE, the second downlink control channel to the second UE, and the first downlink shared channel to the first UE, and where wireless resources for the first downlink shared channel are based on the rate-matching.

An apparatus for wireless communication at a base station is described. The apparatus may include a processor, memory coupled with the processor, and instructions stored in the memory. The instructions may be executable by the processor to cause the apparatus to determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources, rate-match the first downlink shared channel around the first subset of resources and the second subset of resources, and transmit the first downlink control channel to the first UE, the second downlink control channel to the second UE, and the first downlink shared channel to the first UE, and where wireless resources for the first downlink shared channel are based on the rate-matching.

Another apparatus for wireless communication at a base station is described. The apparatus may include means for determining a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources, rate-matching the first downlink shared channel around the first subset of resources and the second subset of resources, and transmitting the first downlink control channel to the first UE, the second downlink control channel to the second UE, and the first downlink shared channel to the first UE, and where wireless resources for the first downlink shared channel are based on the rate-matching.

A non-transitory computer-readable medium storing code for wireless communication at a base station is described. The code may include instructions executable by a processor to determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources, rate-match the first downlink shared channel around the first subset of resources and the second subset of resources, and transmit the first downlink control channel to the first UE, the second downlink control channel to the second UE, and the first downlink shared channel to the first UE, and where wireless resources for the first downlink shared channel are based on the rate-matching.

In some examples of the method, apparatuses, and non-transitory computer-readable medium described herein, the determining may include operations, features, means, or instructions for identifying a set of search spaces within the control resource set, each of the set of search spaces having a corresponding search space index, identifying a first search space index associated with the first downlink control channel, and determining both the first subset of resources and the second subset of resources based on the first search space index. In some examples of the method, apparatuses, and non-transitory computer-readable medium described herein, the second subset of resources is selected to have a second search space index that is lower than the first search space index. In some examples of the method, apparatuses, and non-transitory computer-readable medium described herein, each of the set of search spaces have a same aggregation level. In some examples of the method, apparatuses, and non-transitory computer-readable medium described herein, the first downlink control channel and the second downlink control channel may have different aggregation levels.

In some examples of the method, apparatuses, and non-transitory computer-readable medium described herein, the determining further may include operations, features, means, or instructions for identifying a largest search space index of one or more search space indices of one or more downlink control channels for the first downlink control channel based on a lowest aggregation level of the different aggregation levels, and determining the second subset of resources based on a number of search spaces having a lower search space index than the identified largest space index. Some examples of the method, apparatuses, and non-transitory computer-readable medium described herein may further include operations, features, means, or instructions for transmitting in indication of a largest search space index of a set of search space indices for each of two or more different aggregation levels to the first UE, and where the rate-matching is based on a number of search spaces at each of the two or more different aggregation levels having a search space index at or below the indicated largest search space index.

Some examples of the method, apparatuses, and non-transitory computer-readable medium described herein may further include operations, features, means, or instructions for transmitting a bitmap to at least the first UE that indicates portions of the control resource set that are included in the first subset of resources and the second subset of resources. In some examples of the method, apparatuses, and non-transitory computer-readable medium described herein, the bitmap indicates resources that are available for the downlink shared channel or indicates resources that are unavailable for the downlink shared channel. In some examples of the method, apparatuses, and non-transitory computer-readable medium described herein, a resolution of each bit of the bitmap may be based on a lowest aggregation level used for downlink control channel transmissions. In some examples of the method, apparatuses, and non-transitory computer-readable medium described herein, the bitmap omits resource locations of the first downlink control channel. Some examples of the method, apparatuses, and non-transitory computer-readable medium described herein may further include operations, features, means, or instructions for transmitting configuration information to at least the first UE that indicates one or more locations in the resources of the control resource set that are unavailable for the downlink shared channel, and where the bitmap omits the indicated one or more locations. In some examples of the method, apparatuses, and non-transitory computer-readable medium described herein, the first UE and the second UE may be scheduled with downlink shared channels that overlap with the first subset of resources and the second subset of resources, and where the bitmap is provided to each of the first UE and the second UE for downlink shared channel rate-matching.

In some examples of the method, apparatuses, and non-transitory computer-readable medium described herein, the first downlink control channel includes an indication of whether one or more rate-matching information fields are provided to the first UE, and where the rate-matching is performed based on the indication. Some examples of the method, apparatuses, and non-transitory computer-readable medium described herein may further include operations, features, means, or instructions for configuring the first UE to enable rate-matching around the first subset of resources and the second subset of resources, or to disable rate-matching around the first subset of resources and the second subset of resources. In some examples of the method, apparatuses, and non-transitory computer-readable medium described herein, each of a set of search spaces within the control resource set may be mapped to a set of control channel elements (CCEs), and where an index for each search space is based on a function of at least one of: an aggregation level (AL), a CCE position of the search space within the control resource set, a time-based index, a UE index, a frequency-based index, or any combinations thereof.

DETAILED DESCRIPTION

Figure 1:
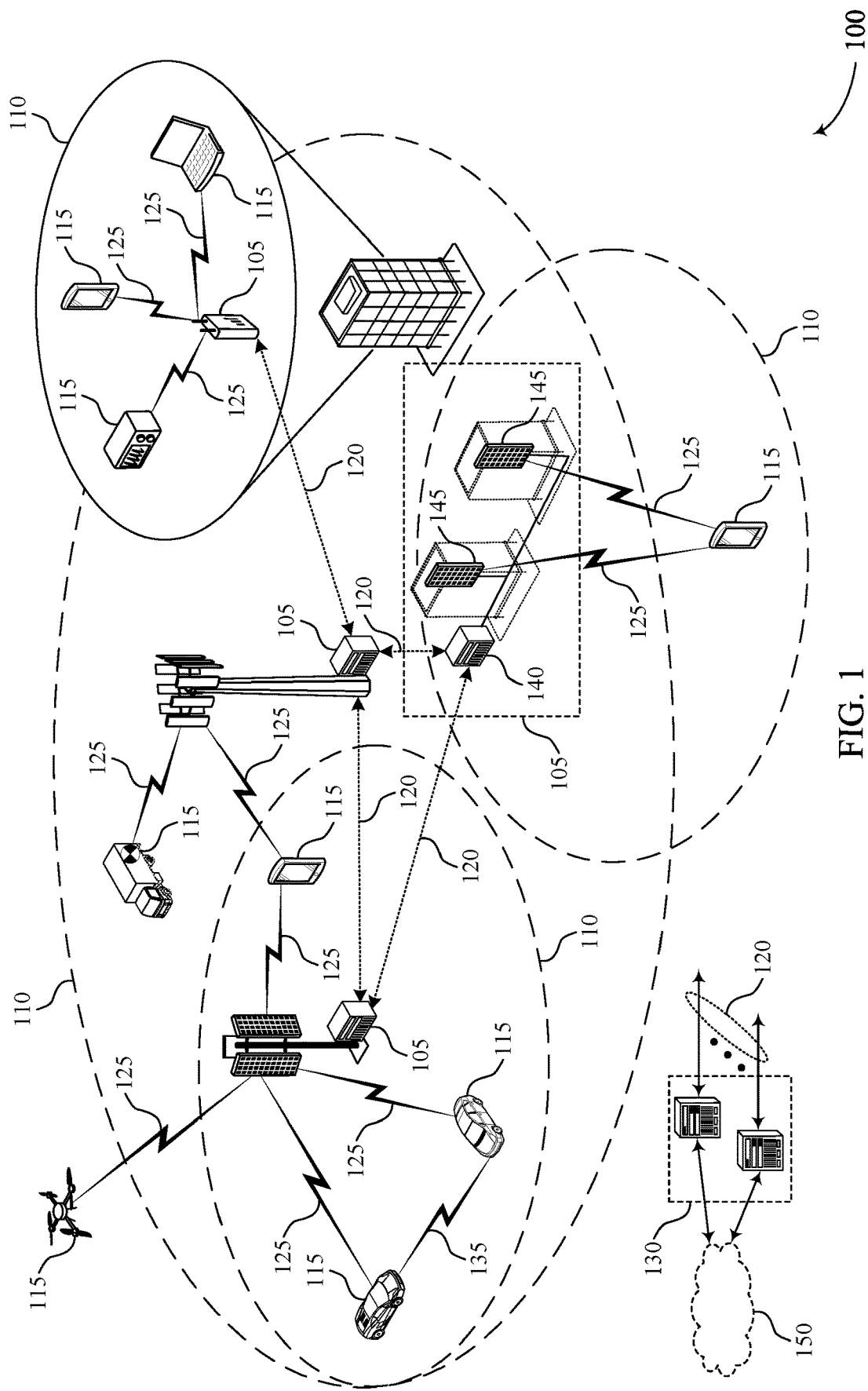
FIG. 1 illustrates an example of a system for wireless communications that supports rate-matching shared channel resources around control channels for multiple users in a control resource set in accordance with aspects of the present disclosure.

Various aspects of the present disclosure provide for rate-matching of data transmissions into resources that are configured as available for control transmissions. In some cases a network node, such as a base station, may configure periodic control resources (e.g., control resource set (CORESET) resources) that may be used to transmit control information to a user equipment (UE). In some cases, a number of UEs may be configured to monitor a set of search spaces that are located within the control resources, such as common search spaces or UE-specific search spaces, for control information (e.g., in a physical downlink control channel (PDCCH)). In some cases, less than all of the control resources may be occupied by control information. Further, in some cases, a data transmission (e.g., a physical downlink shared channel (PDSCH) transmission) to the UE may be scheduled in a same time period (e.g., within a same slot or the same time domain resources) as an instance of the control resources, and in such cases it may be desirable to use all or a portion of the control resources that are not occupied by control information for the data transmission.

In various aspects, in order to avoid underutilizing a portion of the control resources that are not occupied by one or more control channels carrying the control information, an overlapping data transmission may be rate-matched around the occupied control resources. As used herein, rate-matching generally refers to the process of matching a number of bits of a transport channel with a number of bits that can be transmitted in a given allocation, and where the given allocation uses some or all of the unoccupied control resources. Further, as used herein, overlapping time domain resources of the control channel(s) and shared channel(s) refer to time domain resources (e.g., one or more symbols within a slot) within a same or at least partially overlapping frequency domain allocation (e.g., as illustrated and described with reference to FIG. 3), such that rate-matching of shared channel bits around control channel bits within the frequency domain allocation may be performed. While various examples discussed herein refer to exemplary 5G deployments in which the control resources are CORESET resources and the control information is in PDCCHs, the techniques discussed herein may be used in any system or with any radio access technology in which configured control resources may overlap with other types of resources, and control information may occupy less than all of the configured control resources.

In some cases, the control resources (e.g., CORESET resources) may include control channels (e.g., PDCCHs) for multiple UEs, may include control channels having multiple aggregation levels, or any combinations thereof. In some cases, the UE may identify a first search space for a first control channel, and the rate-matching of the data transmission may be performed based on a location of the first search space. For example, search spaces within a CORESET may be indexed, and search spaces having an index value that is greater than a first index value associated with first search space may be considered as unoccupied. Data transmission resources (e.g., PDSCH resources of a slot that contains the CORESET) may then be rate-matched around the occupied control resources (e.g., rate-matched around search spaces having index values at or below the first index value). A base station, when providing control channels within the CORESET, may use CCEs corresponding to search spaces having an index value that is lower than the first index value to provide control information for other UEs or control information for the same UE that provides resource allocations outside of the slot that contains the CORESET.

In some cases, the base station may provide a mapping of resources within the control resources that are occupied. Such a mapping may be based on an indication in the control channel for the UE (e.g., in a PDCCH that schedules a PDSCH that overlaps with the CORESET). In some cases, the indication may be an index value for one or more aggregation levels that indicates a highest index value containing control information at that aggregation level. In some cases, the indication may be provided in a bitmap that indicates which CORESET resources are occupied or unoccupied. In some cases, the bitmap may be configured such that PDCCH resources of the scheduled UE are not indicated in the bitmap, and the UE determines occupied and unoccupied resources based on the bitmap and based on the UE PDCCH resources. In further cases, the bitmap may be configured such that certain resources of the CORESET are to be considered as always occupied, and the UE may further determine occupied and unoccupied resources based on such a configuration. In some cases, the base station may provide an indication in the control information (e.g., a flag or bit in downlink control information (DCI)) that informs the UE whether the control information contains rate-matching information. In some cases, rate-matching in control resources may be enabled or disabled at the UE based on other control signaling (e.g., radio resource control (RRC) signaling may enable/disable CORESET rate-matching).

Techniques such as discussed herein may thus provide a number of benefits and advantages. For example, resources that are unoccupied by control information may be used for other transmissions, such as a data transmission (e.g., PDSCH), and thereby enhance the utilization of wireless resources. Such techniques may thus enhance overall system capacity, increase system throughput, reduce overall latency of the system, and enhance user experience.

Aspects of the disclosure are initially described in the context of wireless communications systems. Various examples of rate-matching and identification of control resources to be rate-matched around are then discussed. Aspects of the disclosure are further illustrated by and described with reference to apparatus diagrams, system diagrams, and flowcharts that relate to rate-matching shared channel resources around control channels for multiple users in a control resource set.

FIG. 1 illustrates an example of a wireless communications system 100 that supports rate-matching shared channel resources around control channels for multiple users in a control resource set in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, base stations 105 may configure periodic control resources for transmission of control information (e.g., CORESETs). In some cases, one or more control channels (e.g., PDCCHs) in the control resources may be identified, and a data transmission (e.g., a PDSCH transmission) may be rate-matched around the one or more control channels in the control resources. In some cases, the control channels may include control information (e.g., DCI) for two or more UEs 115. Additionally or alternatively, the control resources may include control channels having multiple different aggregation levels for one or more UEs 115. In some cases, a UE 115 may identify a search space for a first control channel, and the rate-matching of the data transmission may be performed based on a location of the search space. In other cases, the base station 105 may provide a mapping of resources (e.g., a bitmap) within the control resources that are occupied, which may be used for rate-matching.

Figure 2:
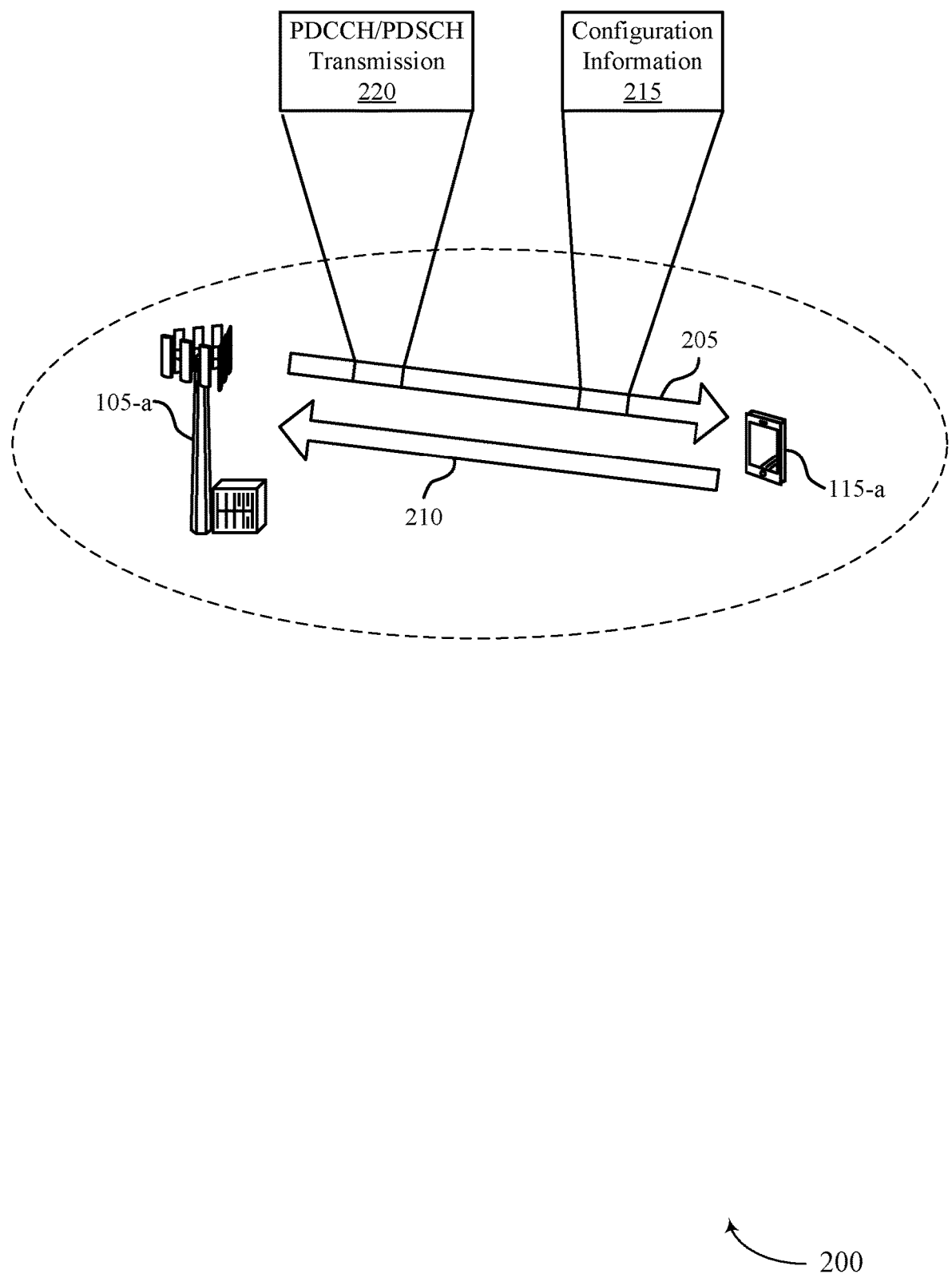
FIG. 2 illustrates an example of a wireless communications system that supports rate-matching shared channel resources around control channels for multiple users in a control resource set in accordance with aspects of the present disclosure.

FIG. 2 illustrates an example of a wireless communications system 200 that supports rate-matching shared channel resources around control channels for multiple users in a control resource set in accordance with aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1. In wireless communications system 200, base station 105-a and UE 115-a may establish a communication link that may be used for downlink communications 205 and uplink communications 210.

In some cases, the base station 105-a may configure periodic control resources (e.g., a CORESET) that may be used to provide control information (e.g., DCI via one or more PDCCHs) to the UE 115-a and one or more other UEs. In some cases, control resources may be provided in every slot. In other cases, control resources may be more sparsely configured and occur with a relatively low periodicity (e.g., once every n slots, where n is greater than one, or in some cases much greater than one). In order not to limit the scheduling flexibility of the base station 105-a with the sparse control channel resources, multiple downlink/uplink scheduling grants (either same-slot or cross-slot grants) for the same UE 115-a, or different UEs, can be delivered in the same control channel (PDCCH) occasion. While the PDCCH occasions may occur relatively infrequently, the use of multiple grants may at least allow multiple transmissions to be scheduled between the sparse PDCCH occasions. This may help accommodate periods of bursty traffic to or from the UE 115-a.

In some cases, the base station 105-a may provide configuration information 215 (e.g., in RRC signaling, in system information, in a medium access control (MAC) control element, and the like) that configures control resources (e.g., a CORESET), and that may also configure rate-matching behavior associated with the control resources. Based on the configuration information 215, the base station 105-a may transmit one or more control information and data transmissions 220 in which the data transmission is in a same slot as the control information. In cases where a control channel in a slot provides a grant for a data transmission in the same slot, which may be referred to as a same-slot grant, data may be delivered to the UE 115-a (e.g., in a PDSCH) within the same slot as the control channel occasion that scheduled the data. Examples of data grants are discussed in more detail with reference to FIG. 3. In some cases, the data transmission (e.g., PDSCH) scheduled by the control channel (e.g., PDCCH) might overlap with the configured control resources (e.g., CORESET) containing the control channel. In such cases, rate-matching techniques such as discussed herein may be performed, with several examples of such rate-matching discussed with reference to FIGS. 3 through 8.

In some existing systems, such as deployments based on release 15 of 3GPP 5G specifications, PDSCH rate-matching may be performed around only the PDCCH that scheduled the PDSCH in the slot. Such techniques may limit the application of multiple grant transmissions in the same CORESET (e.g., if a scheduling base station 105-a avoids using these resources for other grants), or impair the PDSCH decoding performance (e.g., if the scheduling base station 105-*a* does use these resources for other grants). Aspects of the present disclosure provides techniques for rate-matching around not only the control resources that scheduled the data transmission, but other control channels within the control resources. As such, scheduling flexibility may be increased without a negative impact on data decoding. Such techniques thus also allow enhanced flexibility and increased likelihood of decoding success in cases where control resources are sparsely configured, while also providing for efficient utilization of wireless resources.

In some cases, the base station 105-*a* may provide an indication to the UE 115-*a* that indicates whether rate-matching is to be applied to the control resources. In some cases, the indication may be a flag or bit in DCI to inform the UE 115-*a* whether rate-matching is to be used, and in some cases may indicate that the DCI contains the rate-matching information (e.g., an indication of a resource index or bitmap to be used for rate-matching). In some cases, if the overlap between the control information and shared channel is relatively small (e.g., less than a threshold number of control channel elements (CCEs)), the base station 105-*a* may determine that the overhead associated with the extra DCI fields is not to be expended to provide the rate-matching information (e.g., based on a likelihood that the UE 115-*a* will still be able to decode the data transmission). In some cases, rate-matching techniques such as discussed herein may be enabled or disabled in control information, such as via RRC signaling.

Figure 3:
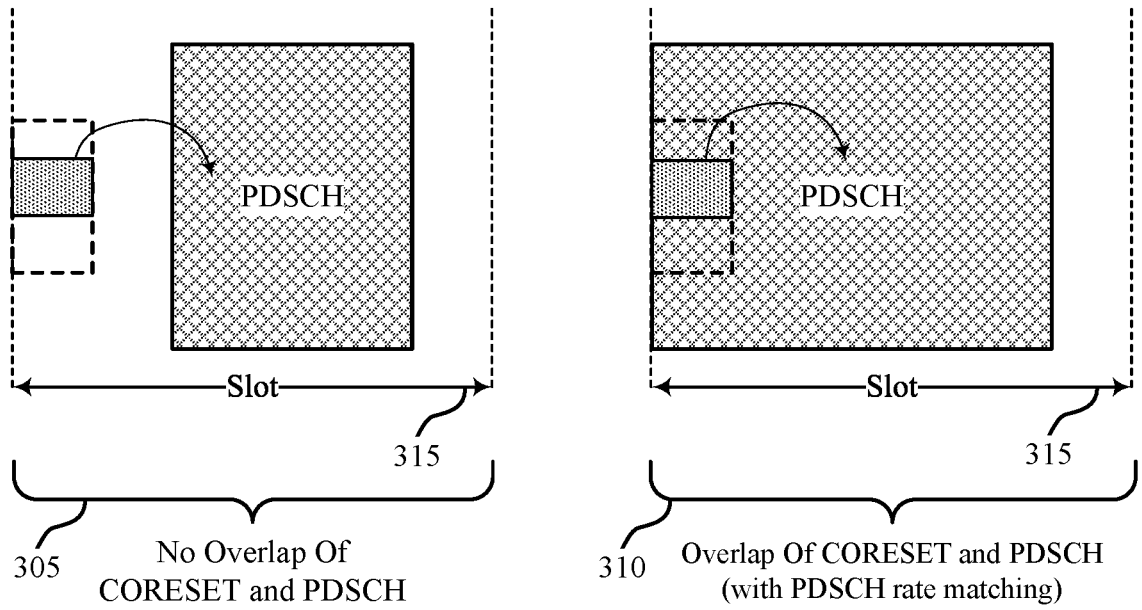
FIG. 3 illustrates examples of control and data resources that support rate-matching shared channel resources around control channels for multiple users in a control resource set in accordance with aspects of the present disclosure.
Figure 3:
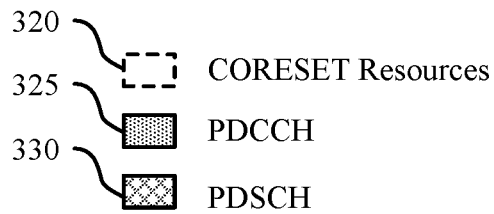

FIG. 3 illustrates examples of control and data resources 300 that support rate-matching shared channel resources around control channels for multiple users in a control resource set in accordance with aspects of the present disclosure. In some examples, control and data resources 300 may implement aspects of wireless communications system 100 or 200. As discussed herein, in some cases control resources 320 (e.g., CORESET resources) may be configured for transmission of control information via control channels such as a PDCCH 325. In some cases, the PDCCH 325 may schedule shared channel resources such as PDSCH 330 resources that are within a same slot 315 as the control resources 320.

In a first example 305, there is no overlap of the control resources 320 and shared channel PDSCH 330 resources within the slot 315. In such cases, rate-matching is unnecessary because the control resources 320 are outside of the PDSCH 330 resources. In a second example 310 of FIG. 3, there is overlap of the control resources 320 and the PDSCH 330 resources. In such cases, the UE and base station may rate-match the PDSCH 330 around PDCCH 325 resources. Such rate-matching may allow for efficient usage of wireless resources by avoiding unused or wasted resources associated of the control resources 320 that are not occupied by PDCCH(s) 325. Various examples for determining resources to be rate-matched around for determining PDSCH 330 rate-matching are discussed with reference to FIGS. 4 through 8.

Figure 4:
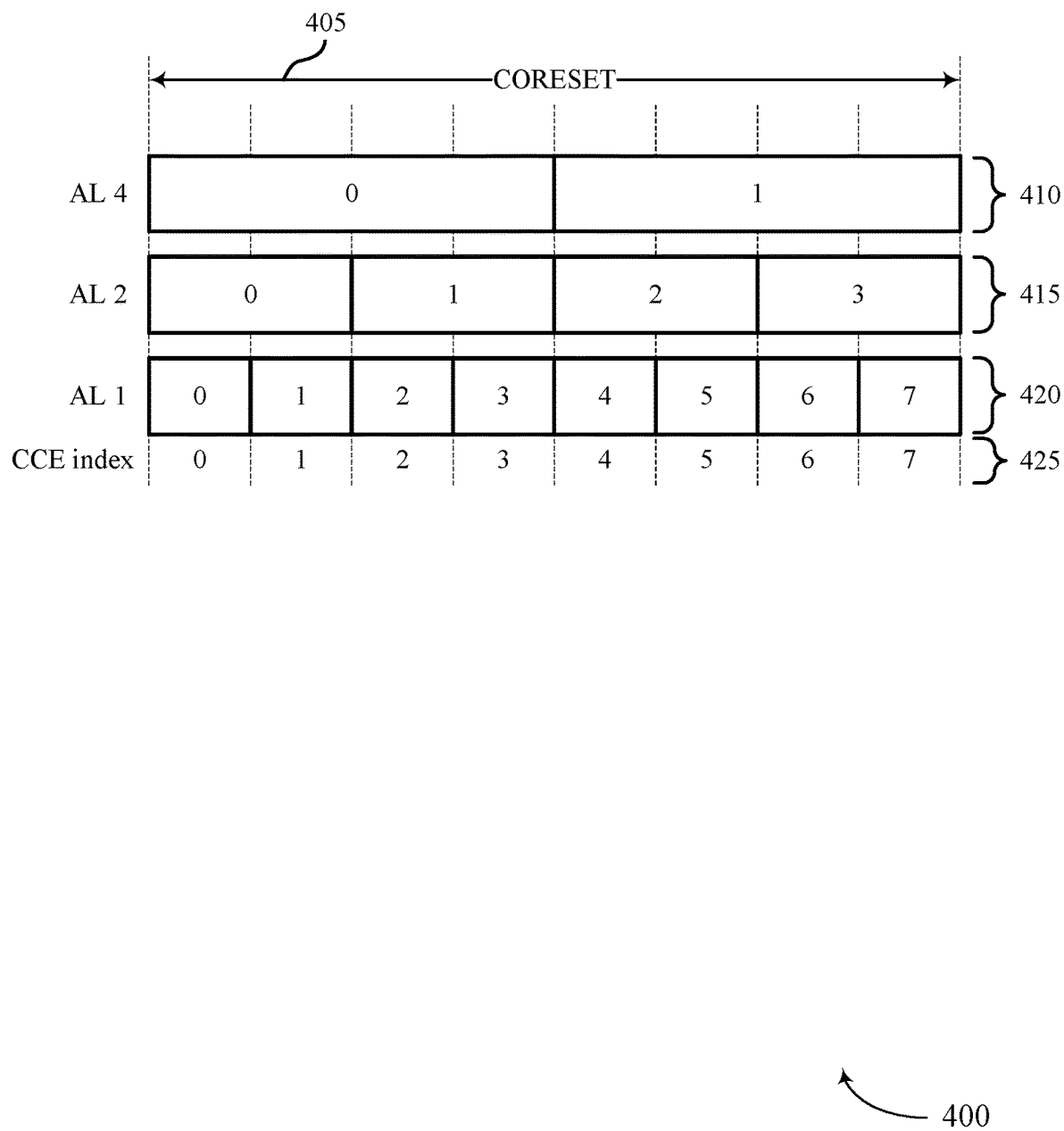
FIG. 4 illustrates an example of CORESET aggregation levels that support rate-matching shared channel resources around control channels for multiple users in a control resource set in accordance with aspects of the present disclosure.

FIG. 4 illustrates examples of CORESET aggregation levels 400 that support rate-matching shared channel resources around control channels for multiple users in a control resource set in accordance with aspects of the present disclosure. In some examples, CORESET aggregation levels 400 may implement aspects of wireless communications system 100 or 200. In this example, a CORESET 405 may include a set of resources that are defined by a set of control channel elements (CCEs). Each CCE may comprise a number of resource element groups (REGs) in which each REG is made up of one resource block (RB) of 12 resource elements in the frequency domain and one OFDM symbol in the time domain. A base station (e.g., a base station 105 of FIG. 1 or 2) may use CORESET 405 resources to transmit one or more PDCCHs to one or more UEs (e.g., one or more UEs 115 of FIG. 1 or 2).

In some cases, the CORESET 405 may include different PDCCHs that have different aggregation levels. The aggregation level indicates how many CCEs are allocated for a PDCCH. In the example of FIG. 4, shown are an aggregation level of one 420 that has one CCE in associated PDCCHs, an aggregation level of two 415 that has two CCEs in associated PDCCHs, and an aggregation level of four 410 that has four CCEs in associated PDCCHs. In various aspects, the CCEs of the CORESET 405 may be indexed using a CCE index 425 in which an index value is mapped to each CCE of the CORESET 405.

In such a manner, an initial CCE of a PDCCH may be indicated to a UE, which may unambiguously identify a subset of resources within the CORESET of the associated PDCCH. In some cases, the CCE index 425 may provide mapped index values based on a lowest aggregation level that is configured for the CORESET 405. Thus, if CORESET 405 is configured for aggregation level two 415 and higher, the CCE index values may correspond to starting CCEs of PDCCHs having aggregation level two. In some cases, a UE may be configured by a base station to monitor one or more particular search spaces within the CORESET 405 for PDCCHs (e.g., in one or more common search spaces, in one or more UE-specific search spaces, or combinations thereof). In some cases, the search spaces may be identified by a starting CCE index value, and the UE may determine the resources to monitor based on the CCE index value and the associated aggregation level.

In some cases, each of a set of search spaces within the control resource set is mapped to a set of control channel elements (CCEs), and where an index for each search space is based on a function of at least one of an aggregation level, a CCE position of the search space within the control resource set, a time-based index, a UE index, a frequency-based index, or any combinations thereof.

Figure 5:
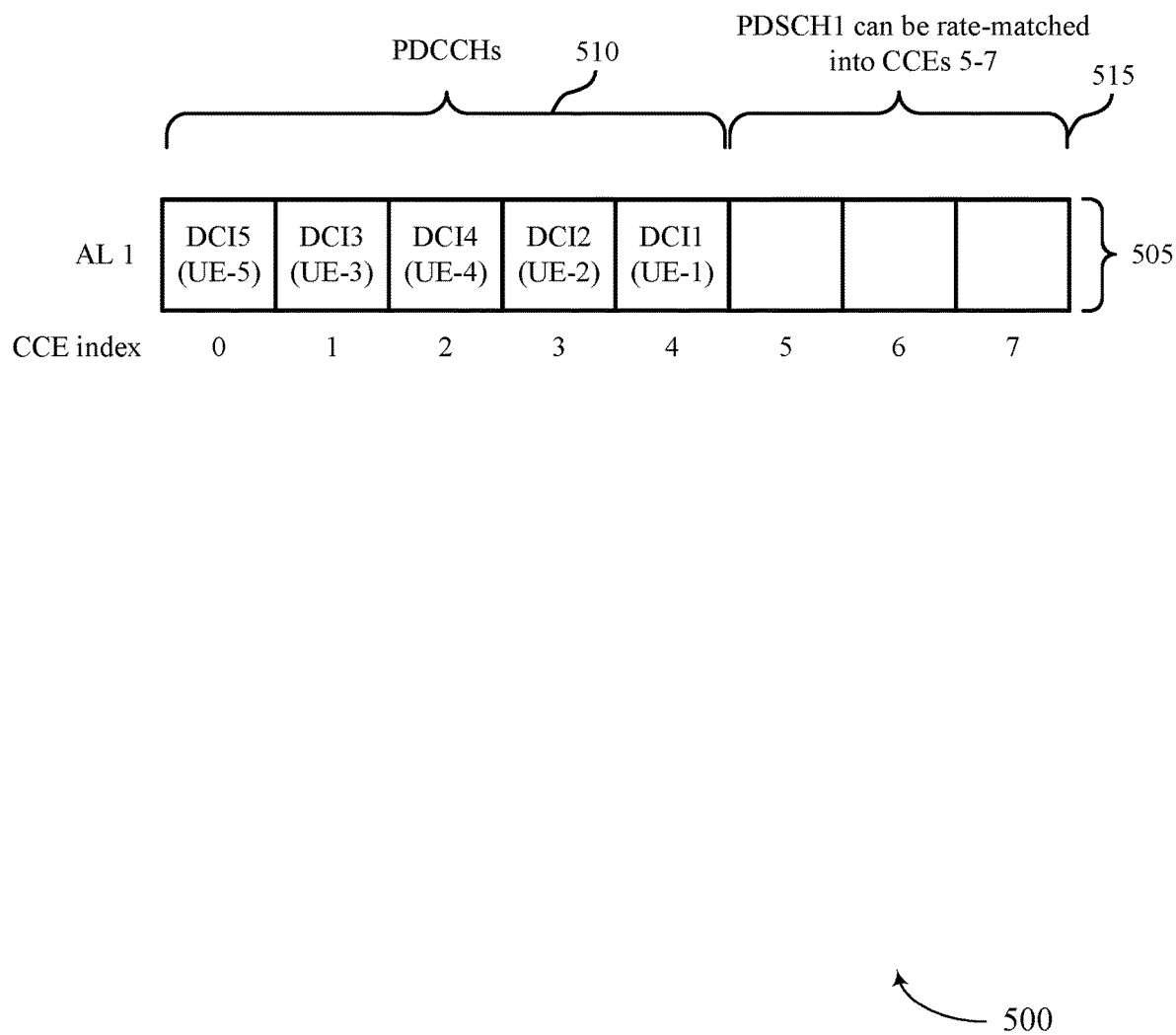
FIG. 5 illustrates an example of a multi-UE control information CORESET that supports rate-matching shared channel resources around control channels for multiple users in a control resource set in accordance with aspects of the present disclosure.

FIG. 5 illustrates an example of a multi-UE control information CORESET 500 that supports rate-matching shared channel resources around control channels for multiple users in a control resource set in accordance with aspects of the present disclosure. In some examples, multi-UE control information CORESET 500 may implement aspects of wireless communications system 100 or 200. In this example, CORESET 500 may include available resources 505 for a number of CCEs, and an aggregation level of one may be used for control information transmission in PDCCHs (i.e., each PDCCH has one CCE).

In this example, a single aggregation level is used in the CORESET 500, and a subset of resources 510 of the available resources 505 may include control information for multiple UEs. In this example, a first UE (i.e., UE-1) may be scheduled in a first DCI (i.e., DCI1) for a first PDSCH (PDSCH1) that is in a same slot as CORESET 500 and that has overlapping resources with the CORESET 500. In accordance with various aspects of the present disclosure, one or more other CCEs may include one or more other PDCCHs that contain DCI for other allocations to the first UE (e.g., cross-slot resource allocations for one or more subsequent slots) or to one or more different UEs. In this example, a second UE (i.e., UE-2) may be scheduled in a second DCI (i.e., DCI2), a fourth UE (i.e., UE-4) may be scheduled in a fourth DCI (i.e., DCI4), a third UE (i.e., UE-3) may be scheduled in a third DCI (i.e., DCI3), and a fifth UE (i.e., UE-5) may be scheduled in a fifth DCI (i.e., DCI5).

In this example, a second subset of resources 515 corresponding to CCEs 5 through 7 of the available resources 505 are thus unoccupied by PDCCHs, and thus the PDSCH for the first UE can be rate-matched into the second subset of resources 515. In some cases, a base station that is scheduling the DCIs may select a largest PDCCH candidate index among needed PDCCH candidates to schedule the UEs, and use the selected largest PDCCH candidate index for the scheduling DCI that is used to schedule a PDSCH that overlaps with the CORESET resources. Thus, in this example, the base station may identify that five PDCCHs are to be provided, and select the largest PDCCH index for the PDCCH carrying DCI1 to the first UE. The first UE may then, upon decoding DCI1 and identifying that the scheduled PDSCH overlaps with the CORESET, perform rate-matching based on the location of DCI1 within the CORESET to identify the subset of resources 510 to be rate-matched around for the PDSCH. The first UE may then process the PDSCH based on the determined rate-matching, in which the PDSCH is rate-matched into the second subset of resources 515. The base station may schedule the PDCCHs for the remaining UEs at lower PDCCH indices (i.e., corresponding to CCE indices 0 through 3 in the aggregation level 1 example of FIG. 5). Techniques provided herein may also be used for PDCCHs with different aggregation levels, as discussed with reference to various examples in FIGS. 6 through 8.

Figure 6:
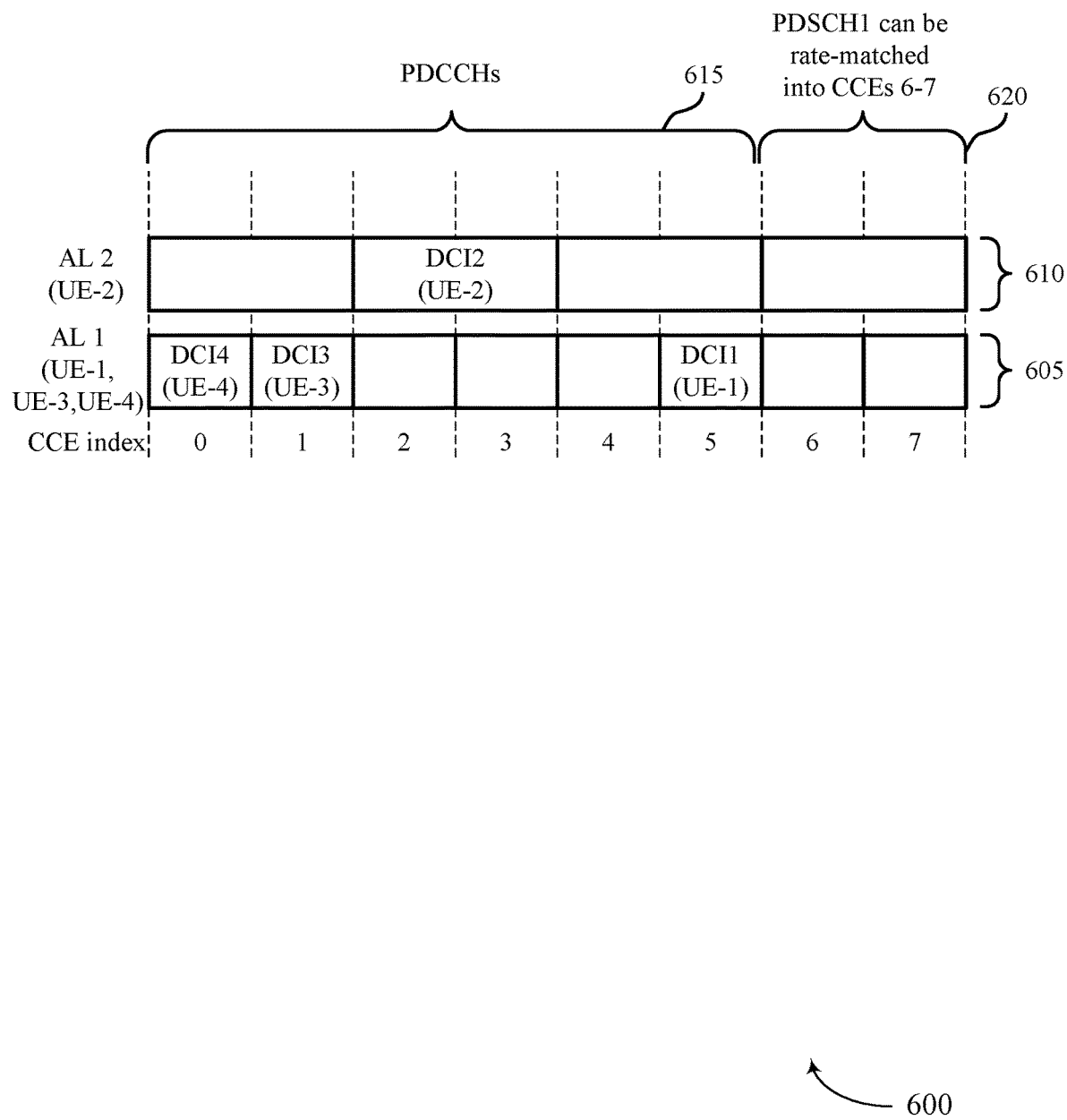
FIG. 6 illustrates an example of a multi-UE and multi-aggregation level control information CORESET that supports rate-matching shared channel resources around control channels for multiple users in a control resource set in accordance with aspects of the present disclosure.

FIG. 6 illustrates an example of a multi-UE and multi-aggregation level control information CORESET 600 that supports rate-matching shared channel resources around control channels for multiple users in a control resource set in accordance with aspects of the present disclosure. In some examples, multi-UE and multi-aggregation level control information CORESET 600 may implement aspects of wireless communications system 100 or 200. In this example, CORESET 600 may include a number of CCEs, and multiple different aggregation levels may be used for control information transmission in PDCCHs.

In this example, PDCCHs may use aggregation level 1 605, and aggregation level 2 610. Aggregation level 1 605 may have one PDCCH per CCE, while aggregation level 2 610 may have one PDCCH span two CCEs. In some cases, a UE may be configured with a number of search spaces that correspond to the CCE(s) that may carry PDCCH for the UE, and a search space index value may be mapped to each potential PDCCH location for one or more aggregation levels. In this example, a subset of resources 615 may include control information for multiple UEs at multiple aggregation levels. In this example, a first UE (i.e., UE-1) may be scheduled in a first DCI (i.e., DCI1) at aggregation level 1 605 for a first PDSCH (PDSCH1) that is in a same slot as CORESET 600 and that has overlapping resources with the CORESET 600. In accordance with various aspects of the present disclosure, one or more other CCEs of CORESET 600 may include one or more other PDCCHs that contain DCI for other allocations to the first UE (e.g., cross-slot resource allocations for one or more subsequent slots) or to one or more different UEs. In this example, a second UE (i.e., UE-2) may be scheduled in a second DCI (i.e., DCI2) at aggregation level 2 610, and third and fourth UEs (i.e., UE-3 and UE-4) may be scheduled in respective third and fourth DCIs (DCI3, DCI4) at aggregation level 1 605. In this example, a second subset of resources 620 corresponding to CCEs 6 through 7 of the CORESET 600 resources are thus unoccupied by PDCCHs, and thus the PDSCH for the first UE can be rate-matched into the second subset of resources 620.

In some cases, a base station that is scheduling the DCIs may select a largest PDCCH candidate index (which may correspond to a search space index) for the scheduling DCI that is used to schedule a PDSCH that overlaps with the CORESET 600 resources. Thus, in this example, the base station may identify that, across both aggregation levels, CCEs 0 through 5 may include PDCCHs, and select the largest PDCCH index for the PDCCH carrying DCI1 at aggregation level 1 605 to the first UE. The first UE may then, upon decoding DCI1 and identifying that the scheduled PDSCH overlaps with the CORESET, perform rate-matching based on the location of DCI1 within the CORESET to identify the subset of resources 615 to be rate-matched around for the PDSCH. The first UE may then process the PDSCH based on the determined rate-matching, in which the PDSCH is rate-matched into the second subset of resources 620. The base station may schedule the PDCCHs for the remaining UEs to be located in lower CCE indices, or lower PDCCH indices of corresponding aggregation levels.

In other cases, in order to help avoid wasted resources such as in CCE index 4 in the example of FIG. 6, the base station may provide a separate indication in the scheduling DCI, namely DCI1 in this example, that identifies a highest PDCCH index that is occupied at each aggregation level. Thus, in this example, the base station may indicate that DCI2 occupies an aggregation level 2 610 PDCCH index that corresponds to CCE indices 2 and 3. Further, in this example, the base station may indicate that DCI3 occupies an aggregation level 1 605 PDCCH index that corresponds to CCE index 1. In such cases, UE-1 may determine that CCE indices 0 through 4 are occupied by PDCCHs, but that CCE indices 4, 6, and 7 are unoccupied and can thus be rate-matched into for the PDSCH. In other cases, a separate indication may not be provided for the aggregation level of UE-1, and in such cases UE-1 may simply assume that each CE index below the CCE index of DCI1 is occupied.

Figure 7:
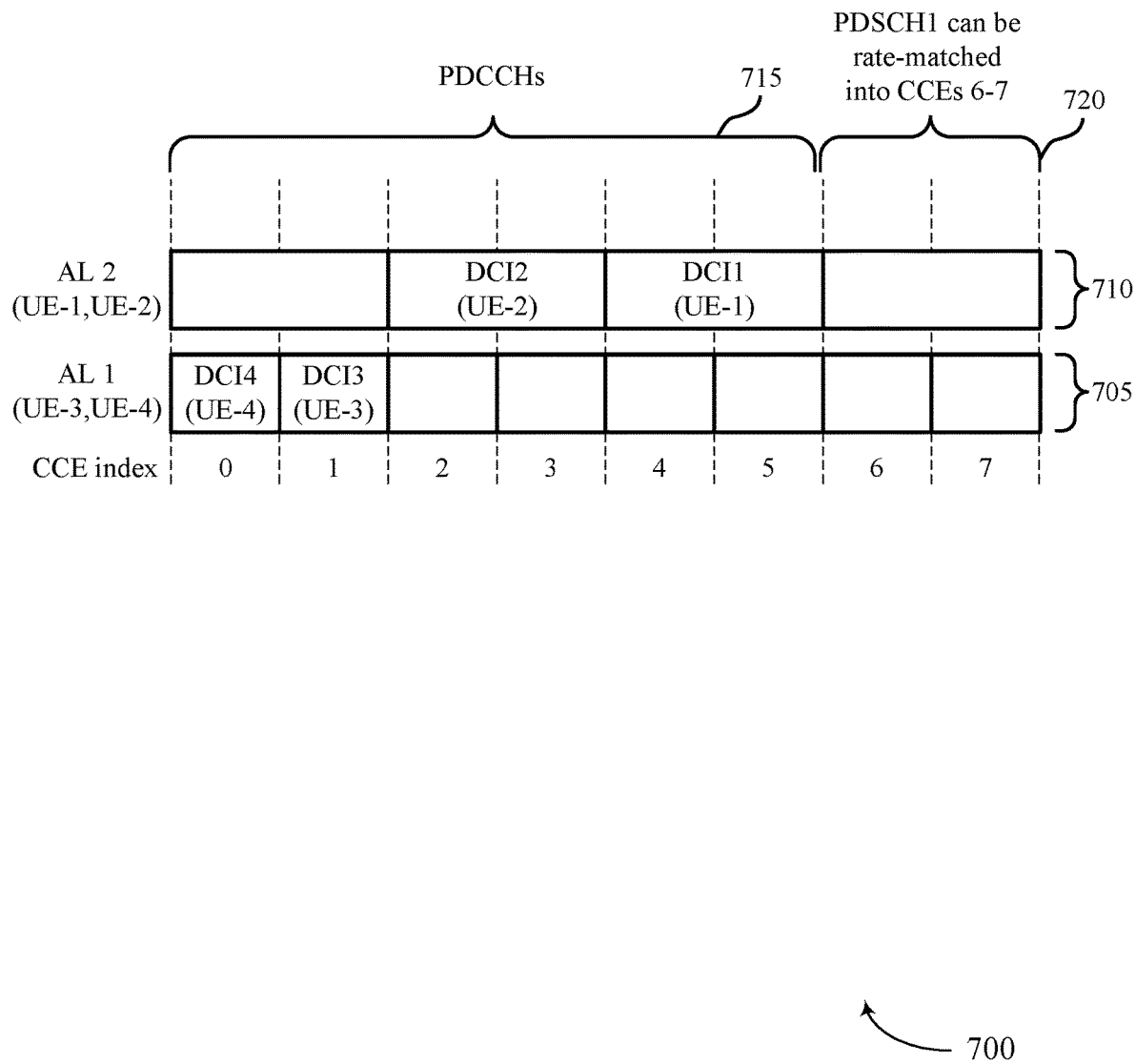
FIG. 7 illustrates an example of a multi-UE and multi-aggregation level control information CORESET that supports rate-matching shared channel resources around control channels for multiple users in a control resource set in accordance with aspects of the present disclosure.

FIG. 7 illustrates another example of a multi-UE and multi-aggregation level control information CORESET 700 that supports rate-matching shared channel resources around control channels for multiple users in a control resource set in accordance with aspects of the present disclosure. In some examples, multi-UE and multi-aggregation level control information CORESET 700 may implement aspects of wireless communications system 100 or 200. In this example, CORESET 700 may include a number of CCEs, and multiple different aggregation levels may be used for control information transmission in PDCCHs.

In this example, similarly as discussed with reference to FIG. 6, PDCCHs may use aggregation level 1 705, and aggregation level 2 710. Aggregation level 1 705 may have one PDCCH per CCE, while aggregation level 2 710 may have one PDCCH span two CCEs. In other examples higher aggregation levels may be used in a similar manner. In this example, a subset of resources 715 may include control information for multiple UEs at multiple aggregation levels. In this example, a first UE (i.e., UE-1) may be scheduled in a first DCI (i.e., DCI1) at aggregation level 2 710 for a first PDSCH (PDSCH1) that is in a same slot as CORESET 700 and that has overlapping resources with the CORESET 700. In accordance with various aspects of the present disclosure, one or more other CCEs of CORESET 700 may include one or more other PDCCHs that contain DCI for other allocations to the first UE (e.g., cross-slot resource allocations for one or more subsequent slots) or to one or more different UEs.

In this example, a second UE (i.e., UE-2) may be scheduled in a second DCI (i.e., DCI2) at aggregation level 2 710, and third and fourth UEs (i.e., UE-3 and UE-4) may be scheduled in respective third and fourth DCIs (DCI3, DCI4) at aggregation level 1 705. In this example, a second subset of resources 720 corresponding to CCEs 6 through 7 of the CORESET 700 resources are thus unoccupied by PDCCHs, and thus the PDSCH for the first UE can be rate-matched into the second subset of resources 720. In some cases, UE-1 may assume that all CCE indices below a highest CCE index of the scheduling PDCCH are occupied. In other cases, the base station may provide in indication of the highest scheduled PDCCH index per aggregation level, which may allow UE-1 to identify which CCE indices are assumed to be occupied at each aggregation level, similarly as discussed with reference to FIG. 6. In still other cases, the base station may provide an explicit indication of which CORESET 700 resources are occupied and unoccupied, an example of which is discussed with reference to FIG. 8.

Figure 8:
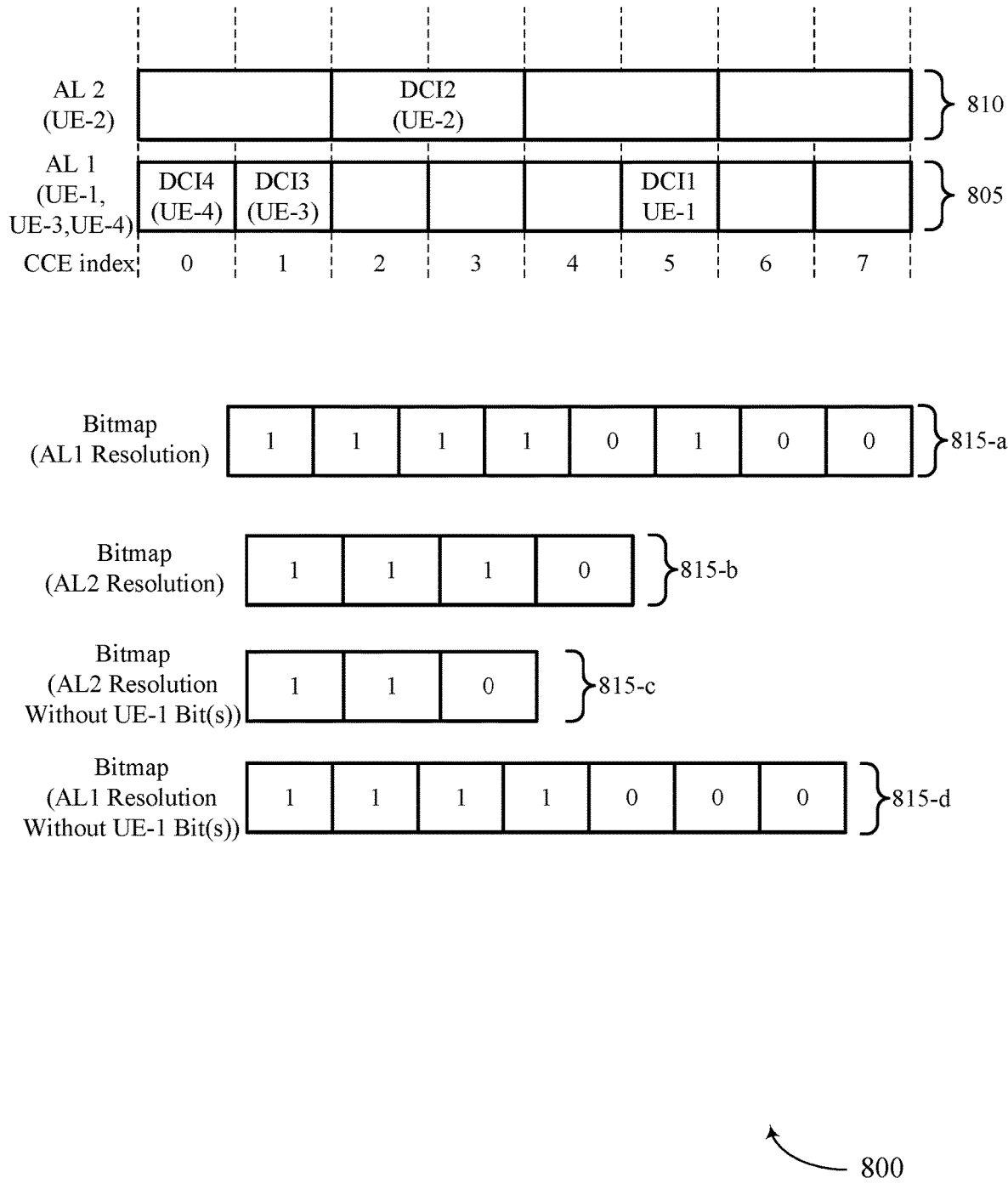
FIG. 8 illustrates examples of control resource bitmaps that support rate-matching shared channel resources around control channels for multiple users in a control resource set in accordance with aspects of the present disclosure.

FIG. 8 illustrates an example of a control resource bitmap 800 that supports rate-matching shared channel resources around control channels for multiple users in a control resource set in accordance with aspects of the present disclosure. In some examples, control resource bitmap 800 may implement aspects of wireless communications system 100 or 200. In this example, again, a CORESET may include a number of CCEs identified by CCE index, and multiple different aggregation levels may be used for control information transmission in PDCCHs.

In this example, PDCCHs may use aggregation level 1 805, and aggregation level 2 810. Aggregation level 1 805 may have one PDCCH per CCE, while aggregation level 2 810 may have one PDCCH span two CCEs. In this example, a first UE (i.e., UE-1) may be scheduled in a first DCI (i.e., DCI1) at aggregation level 1 805 for a first PDSCH (PDSCH1) that is in a same slot as the CORESET and that has overlapping resources with the CORESET. In accordance with various aspects of the present disclosure, one or more other CCEs of CORESET may include one or more other PDCCHs that contain DCI for other allocations to the first UE or to one or more different UEs. In this example, a second UE (i.e., UE-2) may be scheduled in a second DCI (i.e., DCI2) at aggregation level 2 810, and third and fourth UEs (i.e., UE-3 and UE-4) may be scheduled in respective third and fourth DCIs (DCI3, DCI4) at aggregation level 1 805.

In some cases, the base station may provide an explicit indication of resources within the CORESET that are occupied, that are unoccupied, or both. In the example of FIG. 8, a bitmap 815 may be provided by the base station that indicates whether CORESET resources are occupied or unoccupied by control information. The bitmap 815 may have one or several formats that is used to provide such an indication. For example, a first type of bitmap 815-*a* may have a resolution that corresponds to a lowest aggregation level that is used by the CORESET, with each bit in the bitmap 815-*a* corresponding to a CCE index value in this example. Further, the first type of bitmap 815-*a* may have a separate bit that is mapped to a corresponding portion of CORESET resources (e.g., CCE indices in this example, although PDCCH indices may be used in other examples having higher aggregation levels). Based on the bitmap 815-*a*, UE-1 may identify that CCE indices 4, 6, and 7 are unoccupied, and thus the PDSCH for UE-1 can be rate-matched into these CCEs.

In other cases, such as in the exemplary second type of bitmap 815-*b*, the resolution of the bitmap 815-*b* may be at a higher aggregation level (e.g., aggregation level 2), and thus fewer bits may be used to convey the bitmap 815-*b* relative to higher-resolution bitmaps such as the first type of bitmap 815-*a*. Further, in some cases, the PDCCHs of the scheduled UE (i.e., UE-1) may be excluded from the bitmap, such as illustrated in the third type of bitmap 815-*a* in which aggregation level 2 resolution is provided that omits resources that correspond to the PDCCH of UE-1. A fourth type of bitmap 815-*a* illustrates a case where a single CCE resolution is indicated and PDCCHs of the scheduled UE are omitted.

In some cases, the bitmap 815 can indicate the resources available for the scheduled UE for rate matching into the available resources. In other cases, the bitmap 815 may indicate the unavailable resources, so that the scheduled UE may perform rate-matching around the unavailable resources. Additionally or alternatively, in some cases higher layer configurations may be used to reduce the size of the bitmap. For example, an RRC configuration may indicate certain locations in the CORESET will always be unavailable for a specific UE, and these locations can be punctured from the bitmap carried by the DCI. Further, in some cases, multiple UE can be scheduled with PDSCHs that overlap with the CORESET (e.g., UEs in different beam directions) and they can share the resources of the CORESET according to the delivered bitmap 815 conveyed to each of them via the scheduling DCI.

Figure 9:
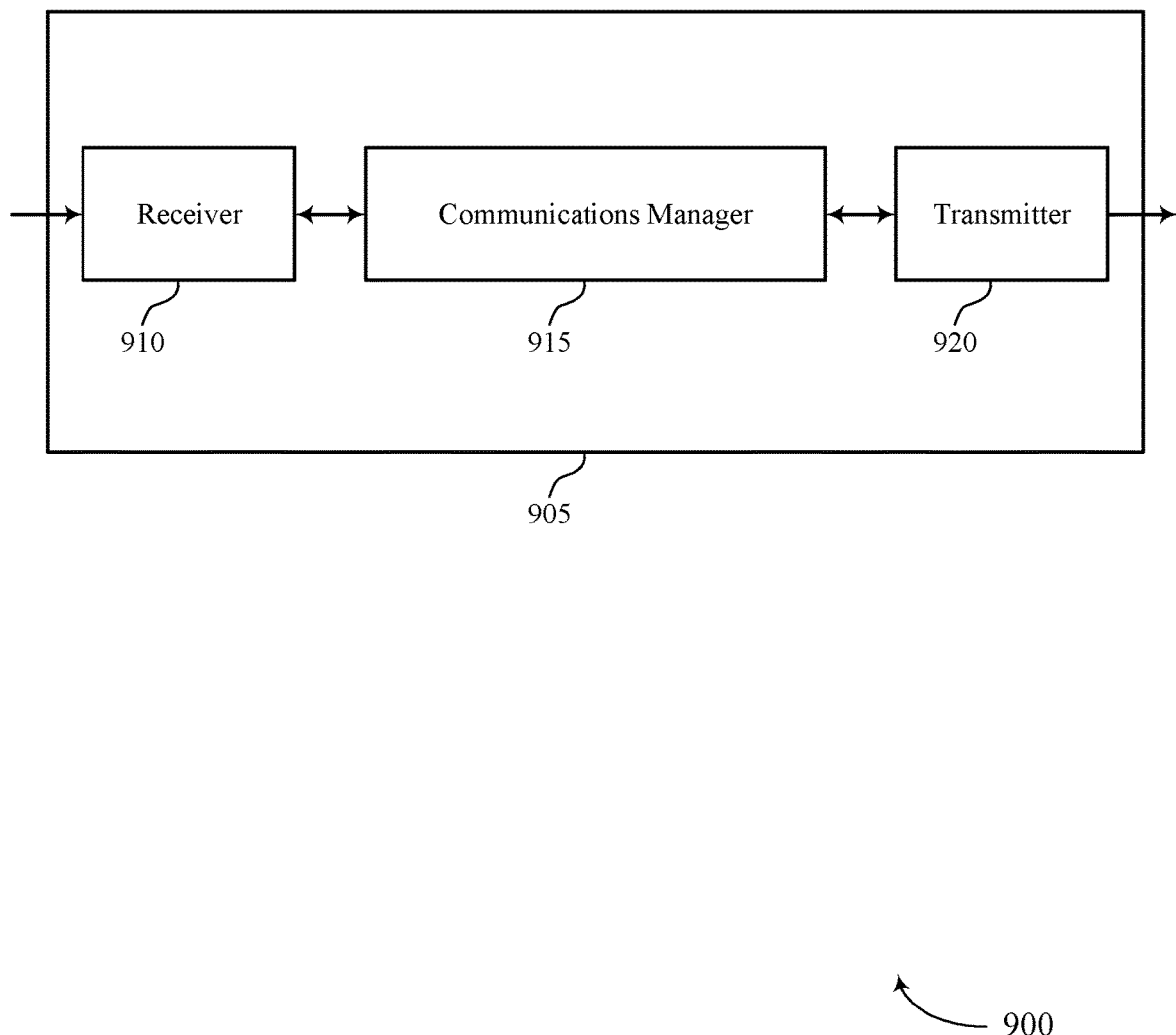
FIGS. 9 and 10 show block diagrams of devices that support rate-matching shared channel resources around control channels for multiple users in a control resource set in accordance with aspects of the present disclosure.

FIG. 9 shows a block diagram 900 of a device 905 that supports rate-matching shared channel resources around control channels for multiple users in a control resource set in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to rate-matching shared channel resources around control channels for multiple users in a control resource set, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a first downlink control channel on resources of a control resource set in time domain resources, where the first downlink control channel schedules a downlink shared channel in the time domain resources that overlaps with the resources of the control resource set in the time domain resources, determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE, and process the downlink shared channel based on the downlink shared channel rate matching. The communications manager 915 may be an example of aspects of the communications manager 1210 described herein.

The communications manager 915 may as described herein be implemented to realize one or more potential advantages. One implementation may allow the device 905 to perform rate-matching of data transmissions with control resources that are unoccupied by control channels, which may provide enhanced efficiency and enhanced usage of available wireless resources. Further, implementations may allow the device 905 to enhance reliability of communications, increase throughput, and enhance user experience, among other advantages.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
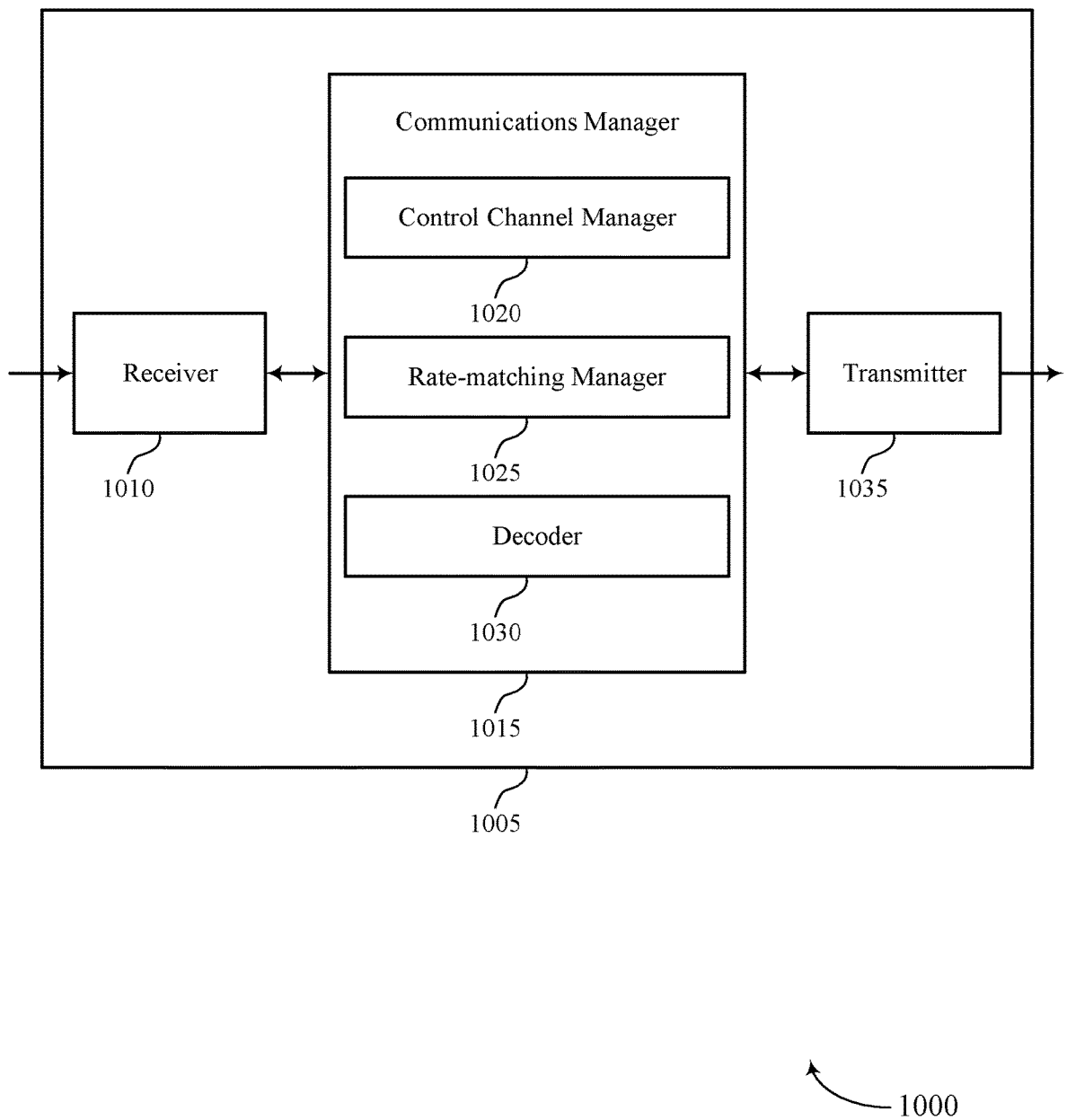

FIG. 10 shows a block diagram 1000 of a device 1005 that supports rate-matching shared channel resources around control channels for multiple users in a control resource set in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to rate-matching shared channel resources around control channels for multiple users in a control resource set, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control channel manager 1020, a rate-matching manager 1025, and a decoder 1030. The communications manager 1015 may be an example of aspects of the communications manager 1210 described herein.

The control channel manager 1020 may receive a first downlink control channel on resources of a control resource set in time domain resources, where the first downlink control channel schedules a downlink shared channel in the time domain resources that overlaps with the resources of the control resource set in the time domain resources.

The rate-matching manager 1025 may determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE.

The decoder 1030 may process the downlink shared channel based on the downlink shared channel rate matching.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
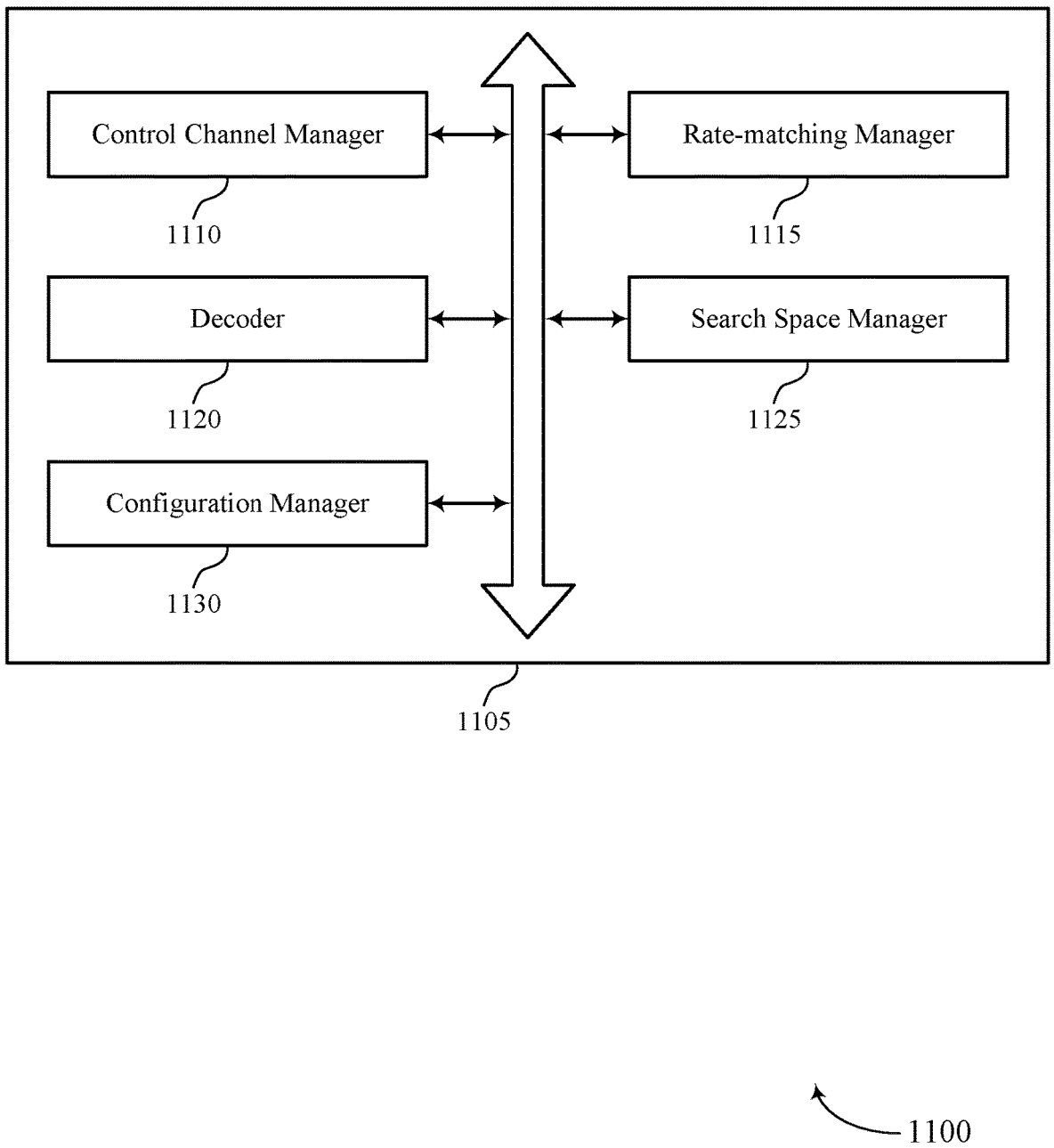
FIG. 11 shows a block diagram of a communications manager that supports rate-matching shared channel resources around control channels for multiple users in a control resource set in accordance with aspects of the present disclosure.

FIG. 11 shows a block diagram 1100 of a communications manager 1105 that supports rate-matching shared channel resources around control channels for multiple users in a control resource set in accordance with aspects of the present disclosure. The communications manager 1105 may be an example of aspects of a communications manager 915, a communications manager 1015, or a communications manager 1210 described herein. The communications manager 1105 may include a control channel manager 1110, a rate-matching manager 1115, a decoder 1120, a search space manager 1125, and a configuration manager 1130. Each of these modules may communicate, directly or indirectly, with one another (e.g., via one or more buses).

The control channel manager 1110 may receive a first downlink control channel on resources of a control resource set in time domain resources, where the first downlink control channel schedules a downlink shared channel in the time domain resources that overlaps with the resources of the control resource set in the time domain resources. In some examples, the control channel manager 1110 may receive a bitmap that indicates portions of the control resource set that are included in the subset of resources. In some cases, the first downlink control channel and the second downlink control channel have different aggregation levels. In some cases, the bitmap indicates resources that are available for the downlink shared channel or indicates resources that are unavailable for the downlink shared channel. In some cases, a resolution of each bit of the bitmap is based on a lowest aggregation level used for downlink control channel transmissions. In some cases, the first downlink control channel includes an indication of whether one or more rate-matching information fields are provided to the first UE, and where the determining and the processing are performed based on the indication. In some cases, the bitmap omits resource locations of the first downlink control channel.

The rate-matching manager 1115 may determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE.

The decoder 1120 may process the downlink shared channel based on the downlink shared channel rate matching.

The search space manager 1125 may identify a set of search spaces within the control resource set, each of the set of search spaces having a corresponding search space index. In some examples, the search space manager 1125 may identify a first search space index associated with the first downlink control channel. In some examples, the search space manager 1125 may determine the subset of resources based on the first search space index.

In some examples, the search space manager 1125 may identify a largest search space index of one or more search space indices of one or more downlink control channels for the first UE based on a lowest aggregation level of the different aggregation levels. In some examples, the search space manager 1125 may determine the subset of resources based on a number of search spaces having a lower search space index than the identified largest space index, and where the downlink shared channel is rate-matched around the subset of resources.

In some examples, the search space manager 1125 may identify a largest search space index of a set of search space indices for each of two or more different aggregation levels based on an indication provided in the first downlink control channel. In some examples, the search space manager 1125 may determine the subset of resources based on a number of search spaces at each of the two or more different aggregation levels having a search space index at or below the indicated largest search space index of each of the two or more different aggregation levels, and where the downlink shared channel is rate-matched around the subset of resources. In some cases, the subset of resources includes a subset of the set of search spaces that have a search space index that is equal to or lower than the first search space index.

The configuration manager 1130 may receive configuration information that indicates one or more locations in the resources of the control resource set that are unavailable for the downlink shared channel, and where the bitmap omits the indicated one or more locations. In some examples, two or more different UEs are scheduled with downlink shared channels that overlap with the subset of resources, and where the bitmap is provided to each of the two or more different UEs for downlink shared channel rate-matching.

In some examples, the configuration manager 1130 may receive, from a base station, configuration information that enables rate-matching around the subset of resources, or that disables rate-matching around the subset of resources. In some cases, each of a set of search spaces within the control resource set is mapped to a set of control channel elements (CCEs), and where an index for each search space is based on a function of at least one of: an aggregation level (AL), a CCE position of the search space within the control resource set, a time-based index, a UE index, a frequency-based index, or any combinations thereof.

Figure 12:
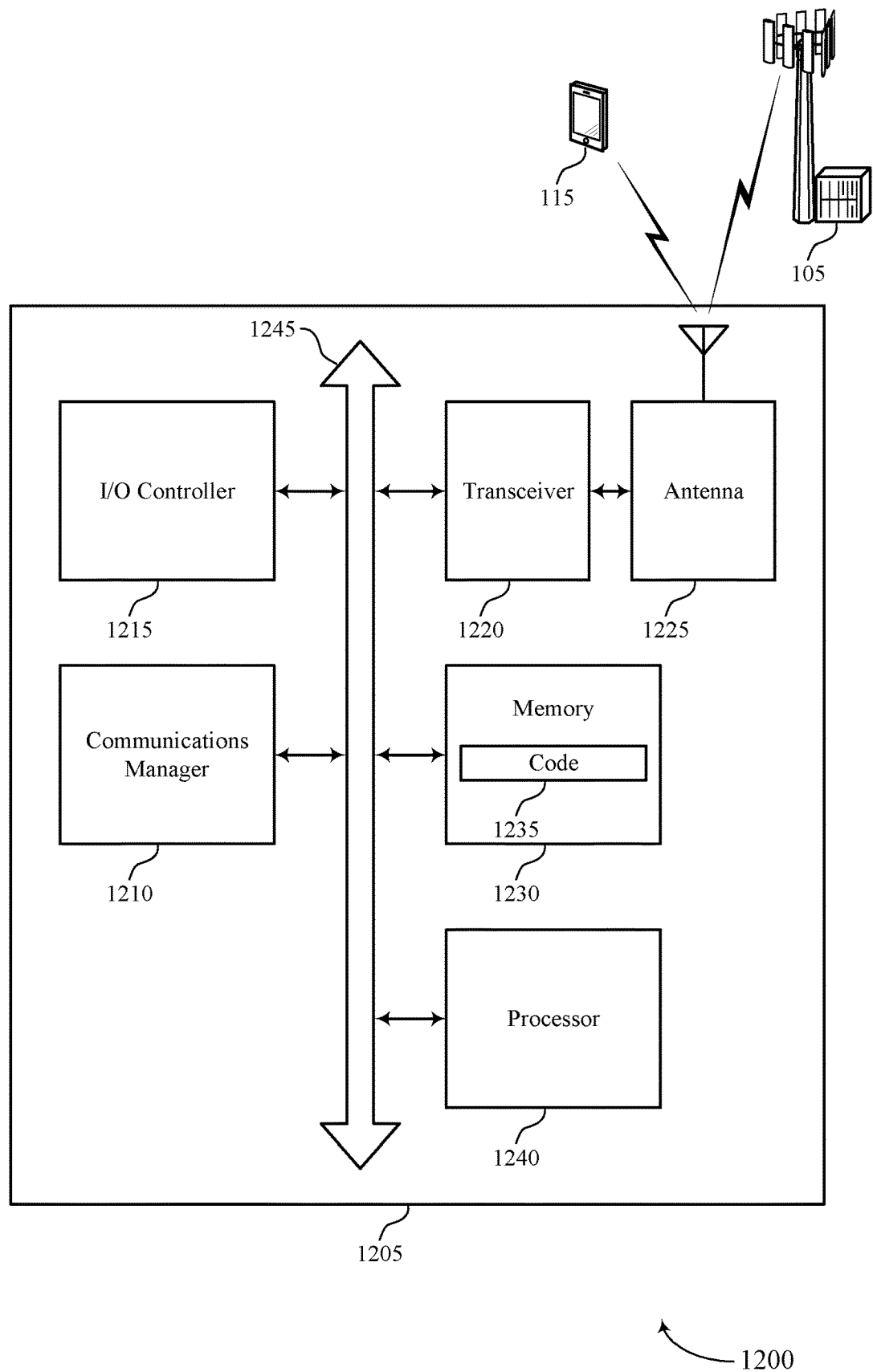
FIG. 12 shows a diagram of a system including a device that supports rate-matching shared channel resources around control channels for multiple users in a control resource set in accordance with aspects of the present disclosure.

FIG. 12 shows a diagram of a system 1200 including a device 1205 that supports rate-matching shared channel resources around control channels for multiple users in a control resource set in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive a first downlink control channel on resources of a control resource set in time domain resources, where the first downlink control channel schedules a downlink shared channel in the time domain resources that overlaps with the resources of the control resource set in the time domain resources, determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE, and process the downlink shared channel based on the downlink shared channel rate matching.

The communications manager 1210 may as described herein be implemented to realize one or more potential advantages. One implementation may allow the device 1205 to perform rate-matching of data transmissions with control resources that are unoccupied by control channels, which may provide enhanced efficiency and enhanced usage of available wireless resources. Further, implementations may allow the device 1205 to enhance reliability of communications, increase throughput, and enhance user experience, among other advantages.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting rate-matching shared channel resources around control channels for multiple users in a control resource set).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
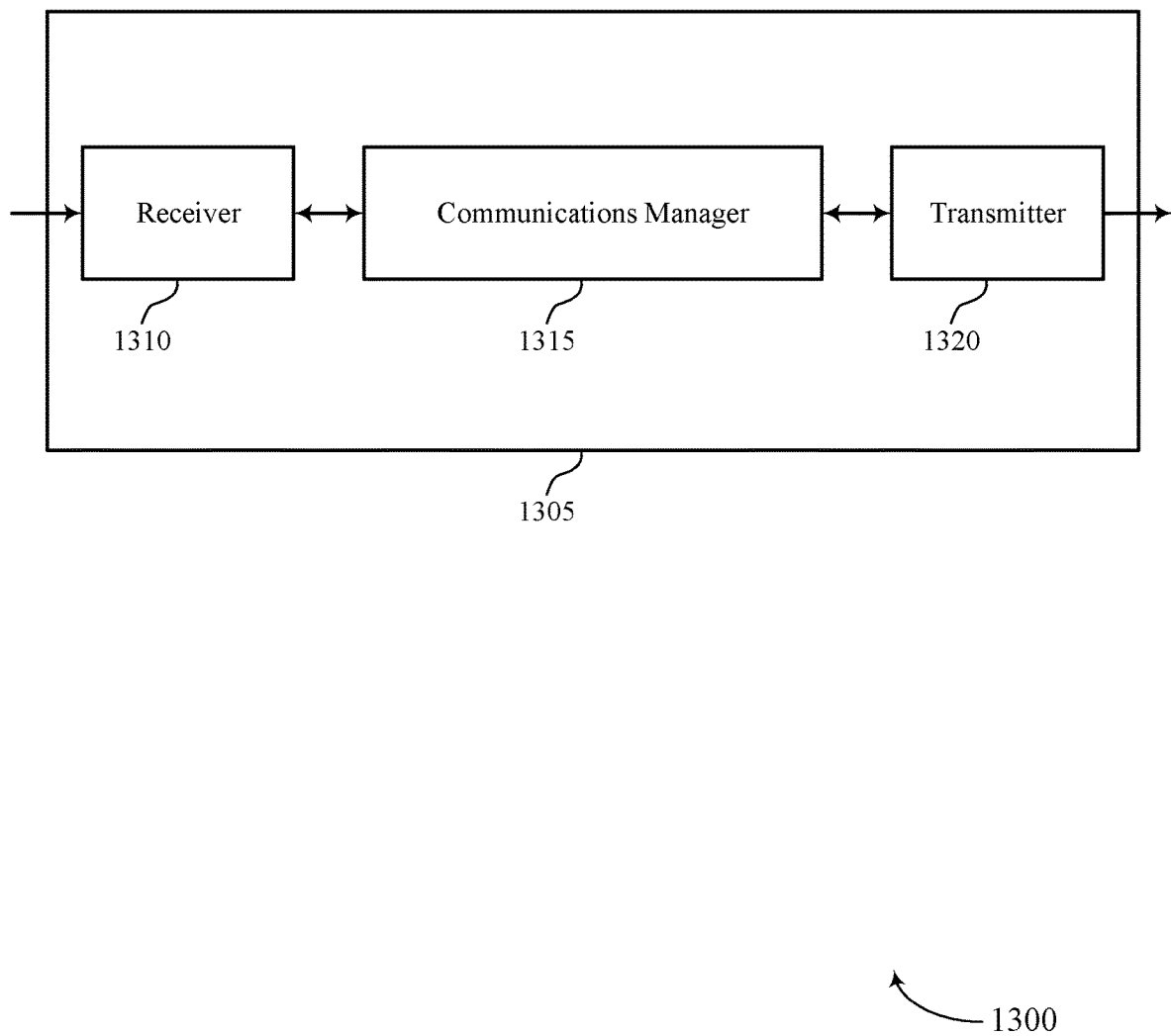
FIGS. 13 and 14 show block diagrams of devices that support rate-matching shared channel resources around control channels for multiple users in a control resource set in accordance with aspects of the present disclosure.

FIG. 13 shows a block diagram 1300 of a device 1305 that supports rate-matching shared channel resources around control channels for multiple users in a control resource set in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to rate-matching shared channel resources around control channels for multiple users in a control resource set, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources, rate-match the first downlink shared channel around the first subset of resources and the second subset of resources, and transmit the first downlink control channel to the first UE, the second downlink control channel to the second UE, and the first downlink shared channel to the first UE, and where wireless resources for the first downlink shared channel are based on the rate-matching. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
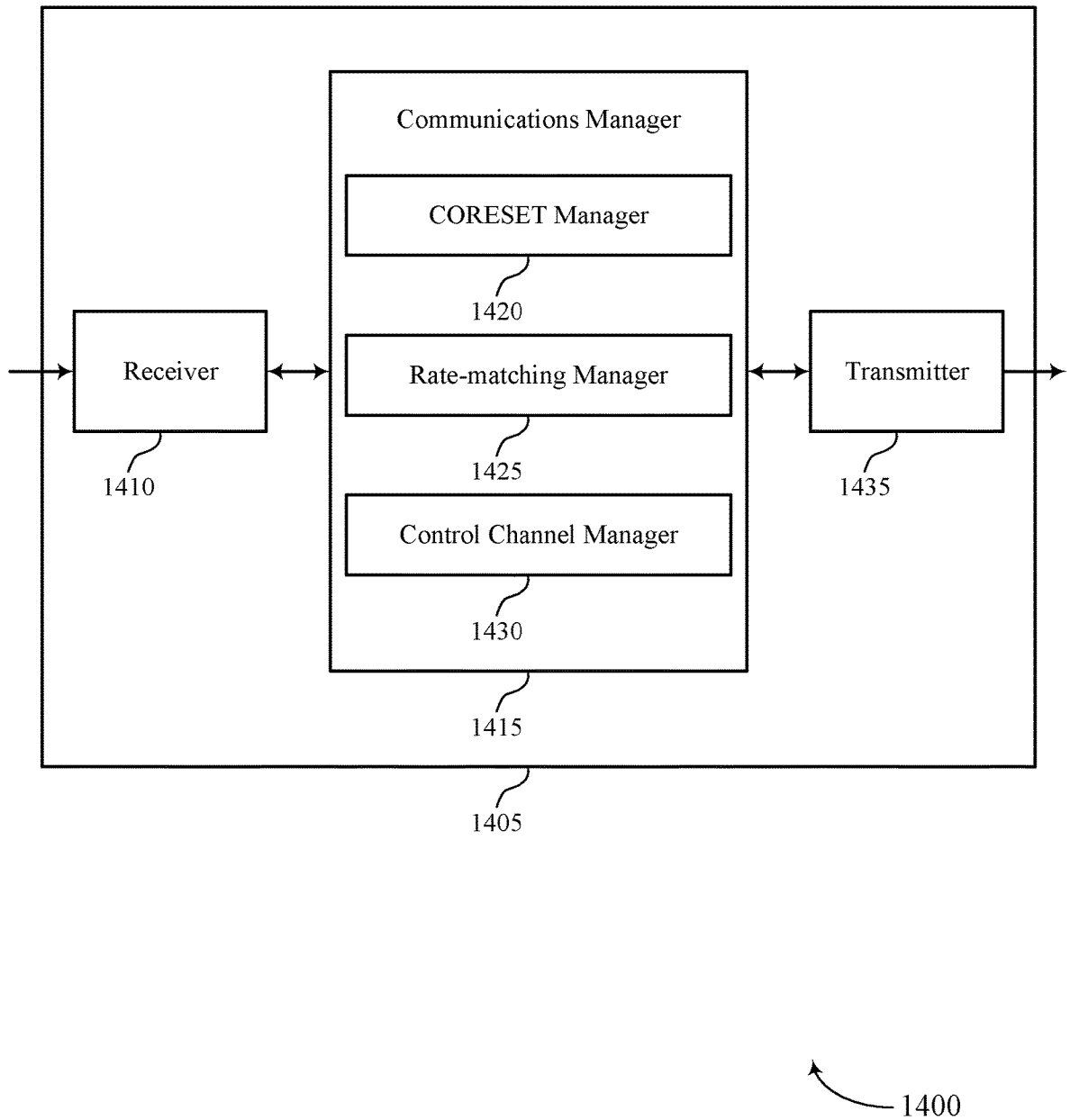

FIG. 14 shows a block diagram 1400 of a device 1405 that supports rate-matching shared channel resources around control channels for multiple users in a control resource set in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to rate-matching shared channel resources around control channels for multiple users in a control resource set, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a CORESET manager 1420, a rate-matching manager 1425, and a control channel manager 1430. The communications manager 1415 may be an example of aspects of the communications manager 1610 described herein.

The CORESET manager 1420 may determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources.

The rate-matching manager 1425 may rate-match the first downlink shared channel around the first subset of resources and the second subset of resources.

The control channel manager 1430 may transmit the first downlink control channel to the first UE, the second downlink control channel to the second UE, and the first downlink shared channel to the first UE, and where wireless resources for the first downlink shared channel are based on the rate-matching.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
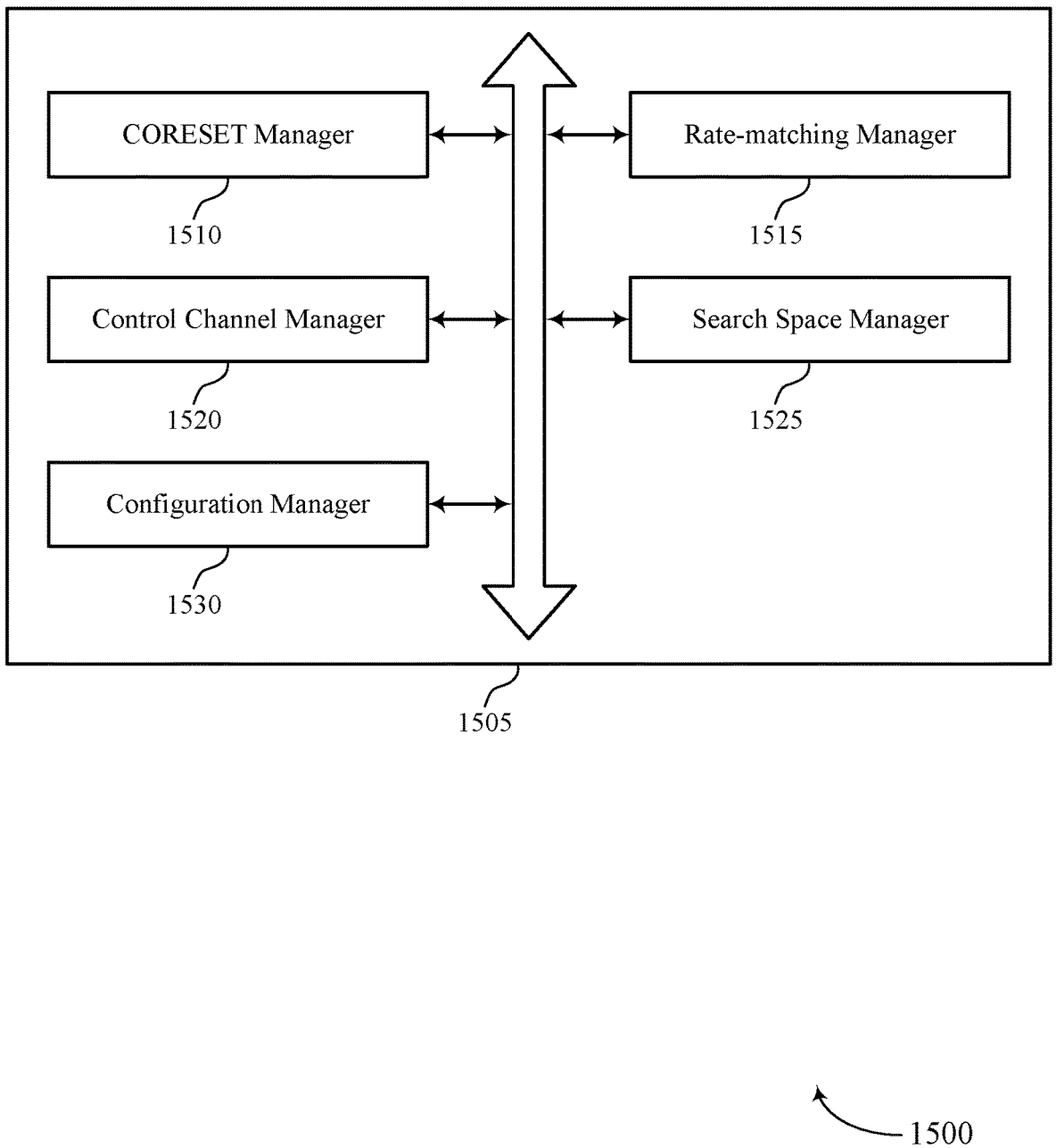
FIG. 15 shows a block diagram of a communications manager that supports rate-matching shared channel resources around control channels for multiple users in a control resource set in accordance with aspects of the present disclosure.

FIG. 15 shows a block diagram 1500 of a communications manager 1505 that supports rate-matching shared channel resources around control channels for multiple users in a control resource set in accordance with aspects of the present disclosure. The communications manager 1505 may be an example of aspects of a communications manager 1315, a communications manager 1415, or a communications manager 1610 described herein. The communications manager 1505 may include a CORESET manager 1510, a rate-matching manager 1515, a control channel manager 1520, a search space manager 1525, and a configuration manager 1530. Each of these modules may communicate, directly or indirectly, with one another (e.g., via one or more buses).

The CORESET manager 1510 may determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources.

The rate-matching manager 1515 may rate-match the first downlink shared channel around the first subset of resources and the second subset of resources.

The control channel manager 1520 may transmit the first downlink control channel to the first UE, the second downlink control channel to the second UE, and the first downlink shared channel to the first UE, and where wireless resources for the first downlink shared channel are based on the rate-matching. In some examples, the control channel manager 1520 may transmit a bitmap to at least the first UE that indicates portions of the control resource set that are included in the first subset of resources and the second subset of resources. In some cases, the first downlink control channel and the second downlink control channel have different aggregation levels. In some cases, the bitmap indicates resources that are available for the downlink shared channel or indicates resources that are unavailable for the downlink shared channel. In some cases, a resolution of each bit of the bitmap is based on a lowest aggregation level used for downlink control channel transmissions. In some cases, the bitmap omits resource locations of the first downlink control channel.

In some cases, the first UE and the second UE are scheduled with downlink shared channels that overlap with the first subset of resources and the second subset of resources, and where the bitmap is provided to each of the first UE and the second UE for downlink shared channel rate-matching. In some cases, the first downlink control channel includes an indication of whether one or more rate-matching information fields are provided to the first UE, and where the rate-matching is performed based on the indication.

The search space manager 1525 may identify a set of search spaces within the control resource set, each of the set of search spaces having a corresponding search space index. In some examples, the search space manager 1525 may identify a first search space index associated with the first downlink control channel. In some examples, the search space manager 1525 may determine both the first subset of resources and the second subset of resources based on the first search space index.

In some examples, the search space manager 1525 may identify a largest search space index of one or more search space indices of one or more downlink control channels for the first downlink control channel based on a lowest aggregation level of the different aggregation levels. In some examples, the search space manager 1525 may determine the second subset of resources based on a number of search spaces having a lower search space index than the identified largest space index.

In some examples, the search space manager 1525 may transmit in indication of a largest search space index of a set of search space indices for each of two or more different aggregation levels to the first UE, and where the rate-matching is based on a number of search spaces at each of the two or more different aggregation levels having a search space index at or below the indicated largest search space index. In some cases, the second subset of resources is selected to have a second search space index that is lower than the first search space index. In some cases, each of the set of search spaces have a same aggregation level.

The configuration manager 1530 may transmit configuration information to at least the first UE that indicates one or more locations in the resources of the control resource set that are unavailable for the downlink shared channel, and where the bitmap omits the indicated one or more locations. In some examples, the configuration manager 1530 may configure the first UE to enable rate-matching around the first subset of resources and the second subset of resources, or to disable rate-matching around the first subset of resources and the second subset of resources. In some cases, each of a set of search spaces within the control resource set is mapped to a set of control channel elements (CCEs), and where an index for each search space is based on a function of at least one of: an aggregation level (AL), a CCE position of the search space within the control resource set, a time-based index, a UE index, a frequency-based index, or any combinations thereof.

Figure 16:
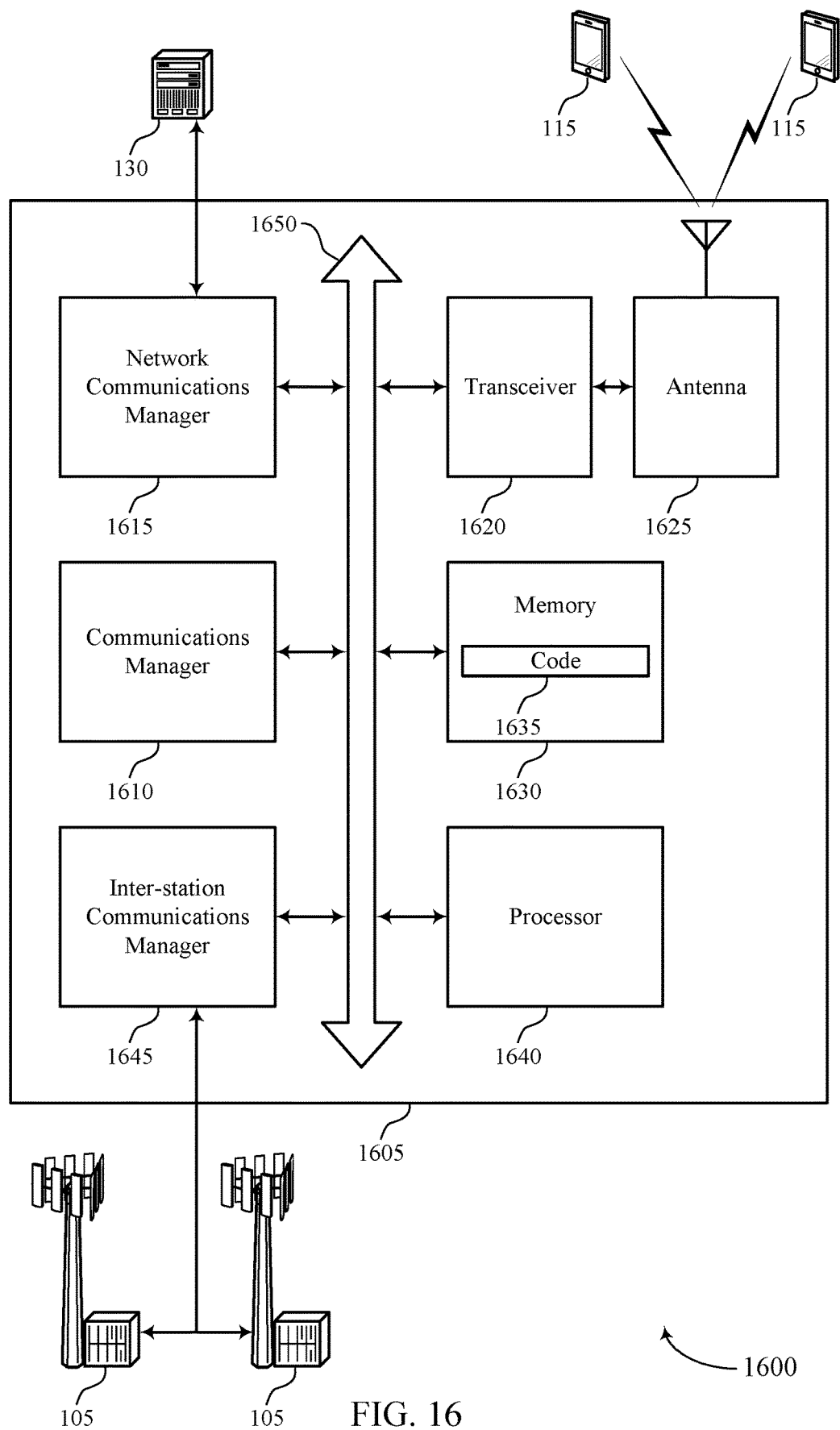
FIG. 16 shows a diagram of a system including a device that supports rate-matching shared channel resources around control channels for multiple users in a control resource set in accordance with aspects of the present disclosure.

FIG. 16 shows a diagram of a system 1600 including a device 1605 that supports rate-matching shared channel resources around control channels for multiple users in a control resource set in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources, rate-match the first downlink shared channel around the first subset of resources and the second subset of resources, and transmit the first downlink control channel to the first UE, the second downlink control channel to the second UE, and the first downlink shared channel to the first UE, and where wireless resources for the first downlink shared channel are based on the rate-matching.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting rate-matching shared channel resources around control channels for multiple users in a control resource set).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
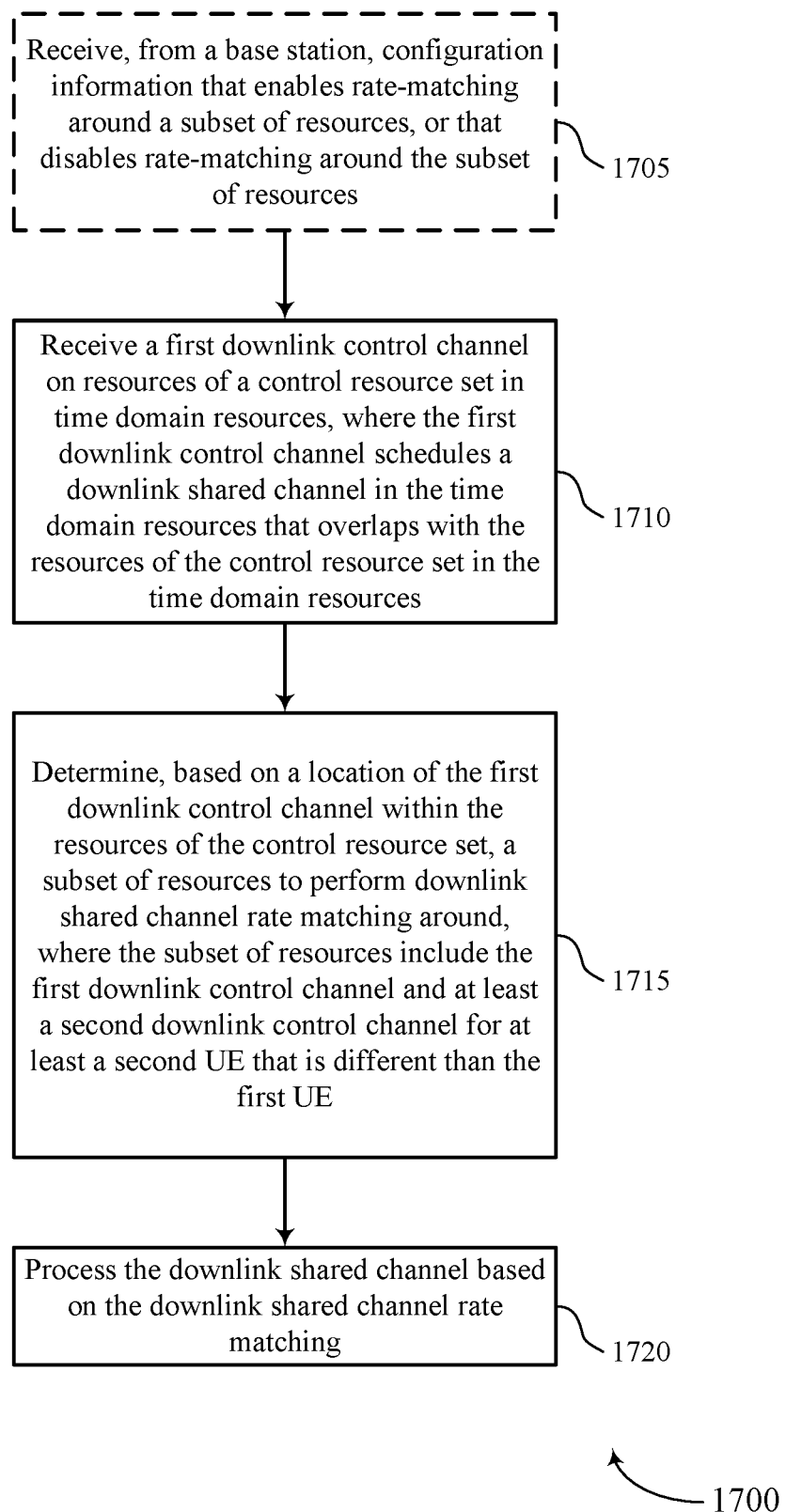
FIGS. 17 through 23 show flowcharts illustrating methods that support rate-matching shared channel resources around control channels for multiple users in a control resource set in accordance with aspects of the present disclosure.

FIG. 17 shows a flowchart illustrating a method 1700 that supports rate-matching shared channel resources around control channels for multiple users in a control resource set in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

Optionally, at 1705, the UE may receive, from a base station, configuration information that enables rate-matching around a subset of resources, or that disables rate-matching around the subset of resources. The operations of 1705 may be performed according to the methods described herein. In some examples, aspects of the operations of 1705 may be performed by a configuration manager as described with reference to FIGS. 9 through 12.

At 1710, the UE may receive a first downlink control channel on resources of a control resource set in time domain resources, where the first downlink control channel schedules a downlink shared channel in the time domain resources that overlaps with the resources of the control resource set in the time domain resources. The operations of 1710 may be performed according to the methods described herein. In some examples, aspects of the operations of 1710 may be performed by a control channel manager as described with reference to FIGS. 9 through 12.

At 1715, the UE may determine, based on a location of the first downlink control channel within the resources of the control resource set, a subset of resources around which downlink shared channel rate matching is to be performed, where the subset of resources include the first downlink control channel and at least a second downlink control channel for at least a second UE that is different than the first UE. The operations of 1715 may be performed according to the methods described herein. In some examples, aspects of the operations of 1715 may be performed by a rate-matching manager as described with reference to FIGS. 9 through 12.

At 1720, the UE may process the downlink shared channel based on the downlink shared channel rate matching. The operations of 1720 may be performed according to the methods described herein. In some examples, aspects of the operations of 1720 may be performed by a decoder as described with reference to FIGS. 9 through 12.

Figure 18:
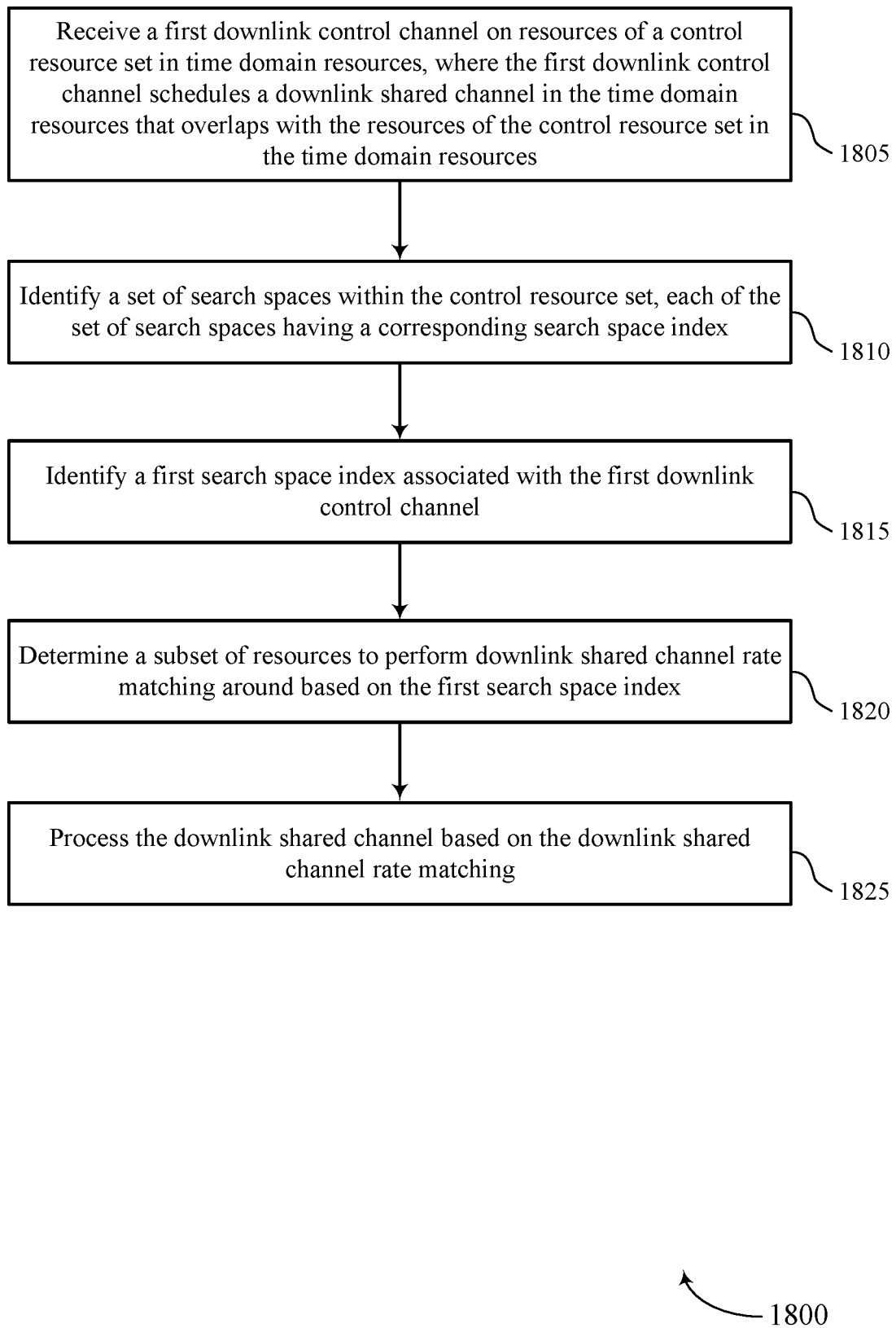

FIG. 18 shows a flowchart illustrating a method 1800 that supports rate-matching shared channel resources around control channels for multiple users in a control resource set in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive a first downlink control channel on resources of a control resource set in time domain resources, where the first downlink control channel schedules a downlink shared channel in the time domain resources that overlaps with the resources of the control resource set in the time domain resources. The operations of 1805 may be performed according to the methods described herein. In some examples, aspects of the operations of 1805 may be performed by a control channel manager as described with reference to FIGS. 9 through 12.

At 1810, the UE may identify a set of search spaces within the control resource set, each of the set of search spaces having a corresponding search space index. The operations of 1810 may be performed according to the methods described herein. In some examples, aspects of the operations of 1810 may be performed by a search space manager as described with reference to FIGS. 9 through 12.

At 1815, the UE may identify a first search space index associated with the first downlink control channel. The operations of 1815 may be performed according to the methods described herein. In some examples, aspects of the operations of 1815 may be performed by a search space manager as described with reference to FIGS. 9 through 12.

At 1820, the UE may determine a subset of resources around which downlink shared channel rate matching is to be performed, based on the first search space index. The operations of 1820 may be performed according to the methods described herein. In some examples, aspects of the operations of 1820 may be performed by a search space manager as described with reference to FIGS. 9 through 12.

At 1825, the UE may process the downlink shared channel based on the downlink shared channel rate matching. The operations of 1825 may be performed according to the methods described herein. In some examples, aspects of the operations of 1825 may be performed by a decoder as described with reference to FIGS. 9 through 12.

Figure 19:
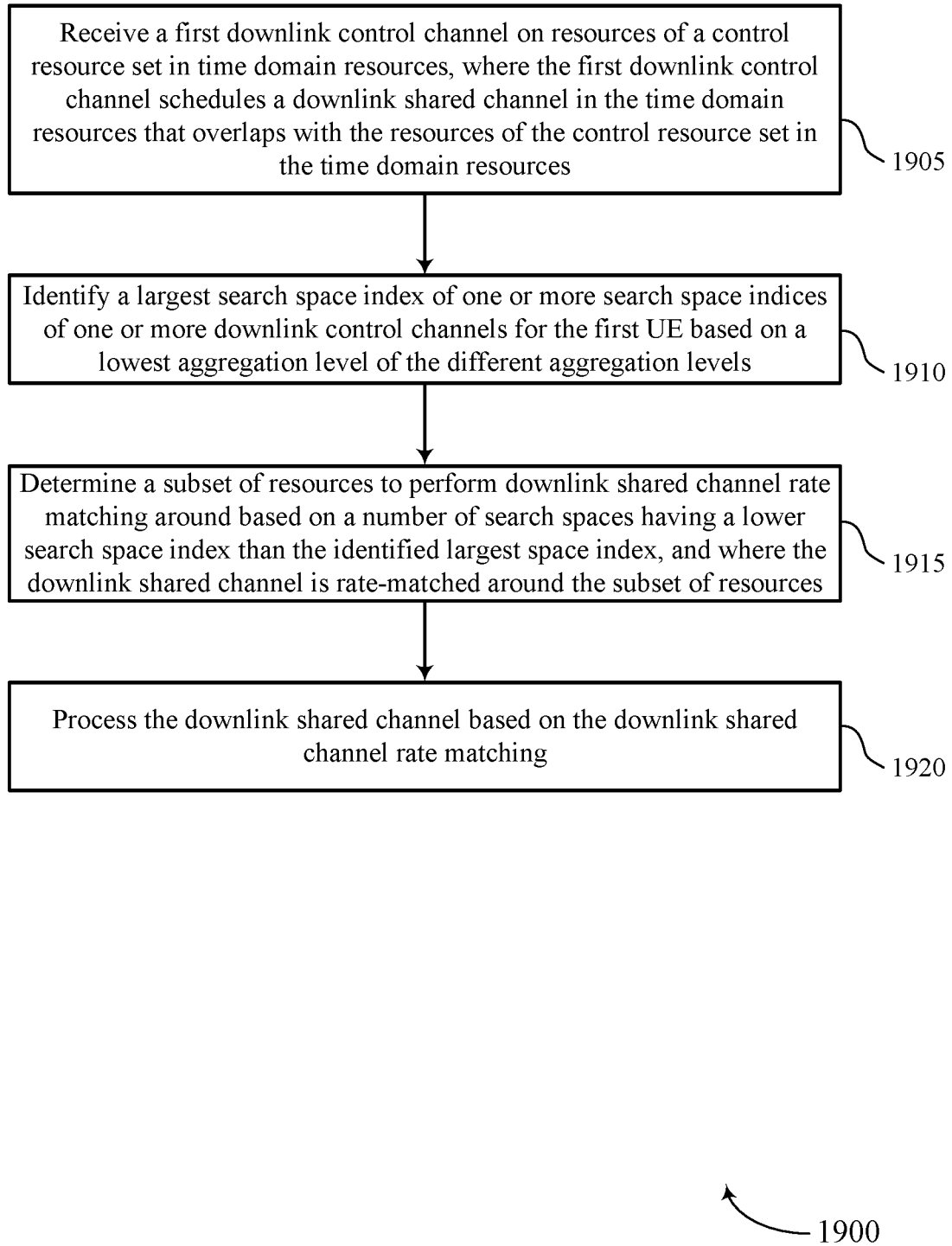

FIG. 19 shows a flowchart illustrating a method 1900 that supports rate-matching shared channel resources around control channels for multiple users in a control resource set in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive a first downlink control channel on resources of a control resource set in time domain resources, where the first downlink control channel schedules a downlink shared channel in the time domain resources that overlaps with the resources of the control resource set in the time domain resources. The operations of 1905 may be performed according to the methods described herein. In some examples, aspects of the operations of 1905 may be performed by a control channel manager as described with reference to FIGS. 9 through 12. In some cases, the control resource set includes multiple downlink control channels, including a first downlink control channel and a second downlink control channel that have different aggregation levels.

At 1910, the UE may identify a largest search space index of one or more search space indices of one or more downlink control channels for the first UE based on a lowest aggregation level of the different aggregation levels. The operations of 1910 may be performed according to the methods described herein. In some examples, aspects of the operations of 1910 may be performed by a search space manager as described with reference to FIGS. 9 through 12. In some cases, the largest search space index for each of two or more different aggregation levels is identified based on an indication provided in the first downlink control channel.

At 1915, the UE may determine a subset of resources around which downlink shared channel rate matching is to be performed, based on a number of search spaces having a lower search space index than the identified largest space index, and where the downlink shared channel is rate-matched around the subset of resources. The operations of 1915 may be performed according to the methods described herein. In some examples, aspects of the operations of 1915 may be performed by a search space manager as described with reference to FIGS. 9 through 12.

At 1920, the UE may process the downlink shared channel based on the downlink shared channel rate matching. The operations of 1920 may be performed according to the methods described herein. In some examples, aspects of the operations of 1920 may be performed by a decoder as described with reference to FIGS. 9 through 12.

Figure 20:
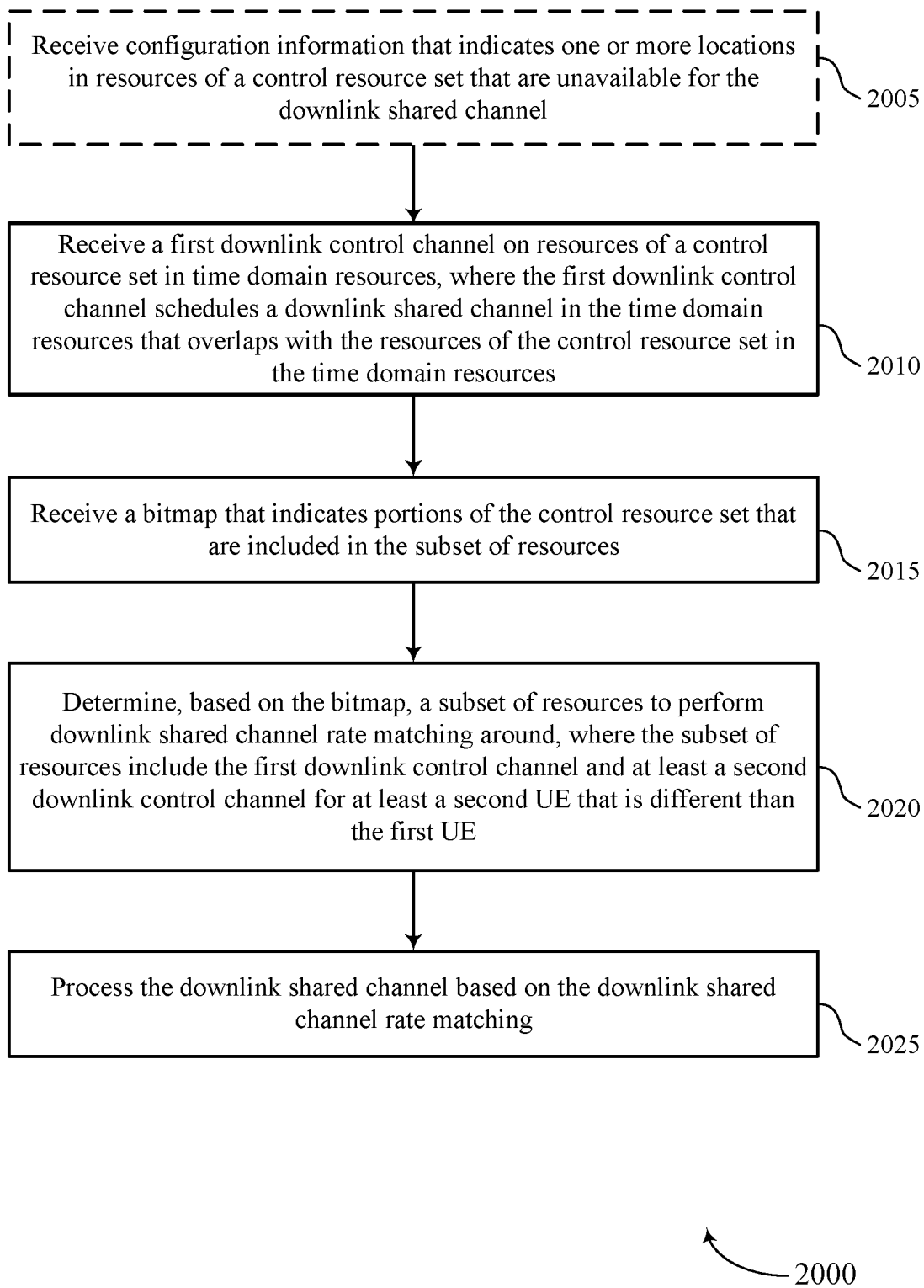

FIG. 20 shows a flowchart illustrating a method 2000 that supports rate-matching shared channel resources around control channels for multiple users in a control resource set in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

Optionally, at 2005, the UE may receive configuration information that indicates one or more locations in resources of a control resource set that are unavailable for the downlink shared channel. The operations of 2005 may be performed according to the methods described herein. In some examples, aspects of the operations of 2005 may be performed by a configuration manager as described with reference to FIGS. 9 through 12.

At 2010, the UE may receive a first downlink control channel on resources of the control resource set in time domain resources, where the first downlink control channel schedules a downlink shared channel in the time domain resources that overlaps with the resources of the control resource set in the time domain resources. The operations of 2010 may be performed according to the methods described herein. In some examples, aspects of the operations of 2010 may be performed by a control channel manager as described with reference to FIGS. 9 through 12.

At 2015, the UE may receive a bitmap that indicates portions of the control resource set that are included in the subset of resources. The operations of 2015 may be performed according to the methods described herein. In some examples, aspects of the operations of 2015 may be performed by a control channel manager as described with reference to FIGS. 9 through 12. In some cases, the bitmap omits the indicated one or more locations in the control resource set that are unavailable for the downlink shared channel.

At 2020, the UE may determine, based on the bitmap, a subset of resources around which downlink shared channel rate matching is to be performed, where the subset of resources include the first downlink control channel and at least a second downlink control channel for at least a second UE that is different than the first UE. The operations of 2020 may be performed according to the methods described herein. In some examples, aspects of the operations of 2020 may be performed by a rate-matching manager as described with reference to FIGS. 9 through 12.

At 2025, the UE may process the downlink shared channel based on the downlink shared channel rate matching. The operations of 2025 may be performed according to the methods described herein. In some examples, aspects of the operations of 2025 may be performed by a decoder as described with reference to FIGS. 9 through 12.

Figure 21:
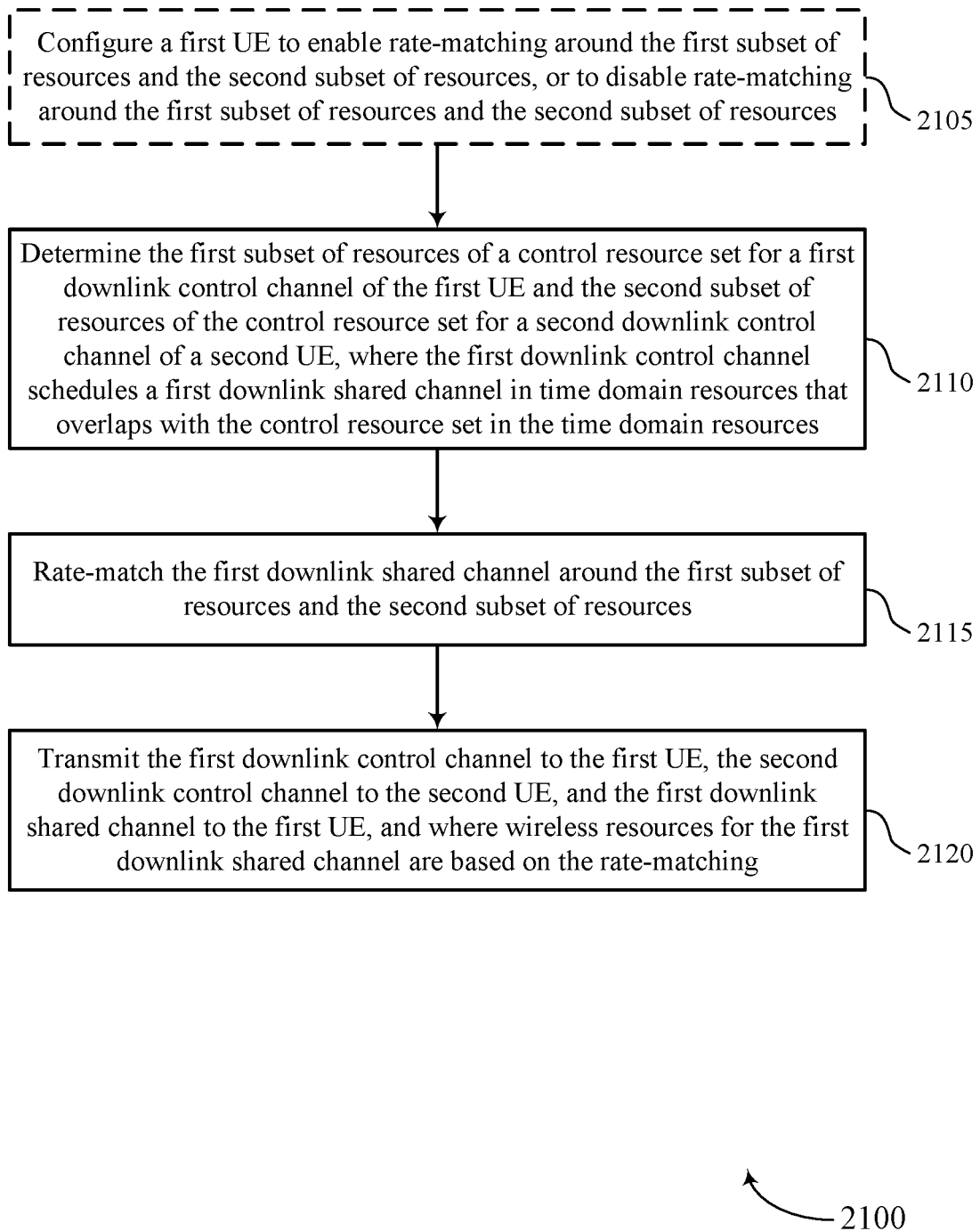

FIG. 21 shows a flowchart illustrating a method 2100 that supports rate-matching shared channel resources around control channels for multiple users in a control resource set in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

Optionally, at 2105, the base station may configure a first UE to enable rate-matching around a first subset of resources and a second subset of resources, or to disable rate-matching around the first subset of resources and the second subset of resources. The operations of 2105 may be performed according to the methods described herein. In some examples, aspects of the operations of 2105 may be performed by a configuration manager as described with reference to FIGS. 13 through 16.

At 2110, the base station may determine the first subset of resources of a control resource set for a first downlink control channel of the first UE and the second subset of resources of the control resource set for a second downlink control channel of a second UE, where the first downlink control channel schedules a first downlink shared channel in time domain resources that overlaps with the control resource set in the time domain resources. The operations of 2110 may be performed according to the methods described herein. In some examples, aspects of the operations of 2110 may be performed by a CORESET manager as described with reference to FIGS. 13 through 16.

At 2115, the base station may rate-match the first downlink shared channel around the first subset of resources and the second subset of resources. The operations of 2115 may be performed according to the methods described herein. In some examples, aspects of the operations of 2115 may be performed by a rate-matching manager as described with reference to FIGS. 13 through 16.

At 2120, the base station may transmit the first downlink control channel to the first UE, the second downlink control channel to the second UE, and the first downlink shared channel to the first UE, and where wireless resources for the first downlink shared channel are based on the rate-matching. The operations of 2120 may be performed according to the methods described herein. In some examples, aspects of the operations of 2120 may be performed by a control channel manager as described with reference to FIGS. 13 through 16.

Figure 22:
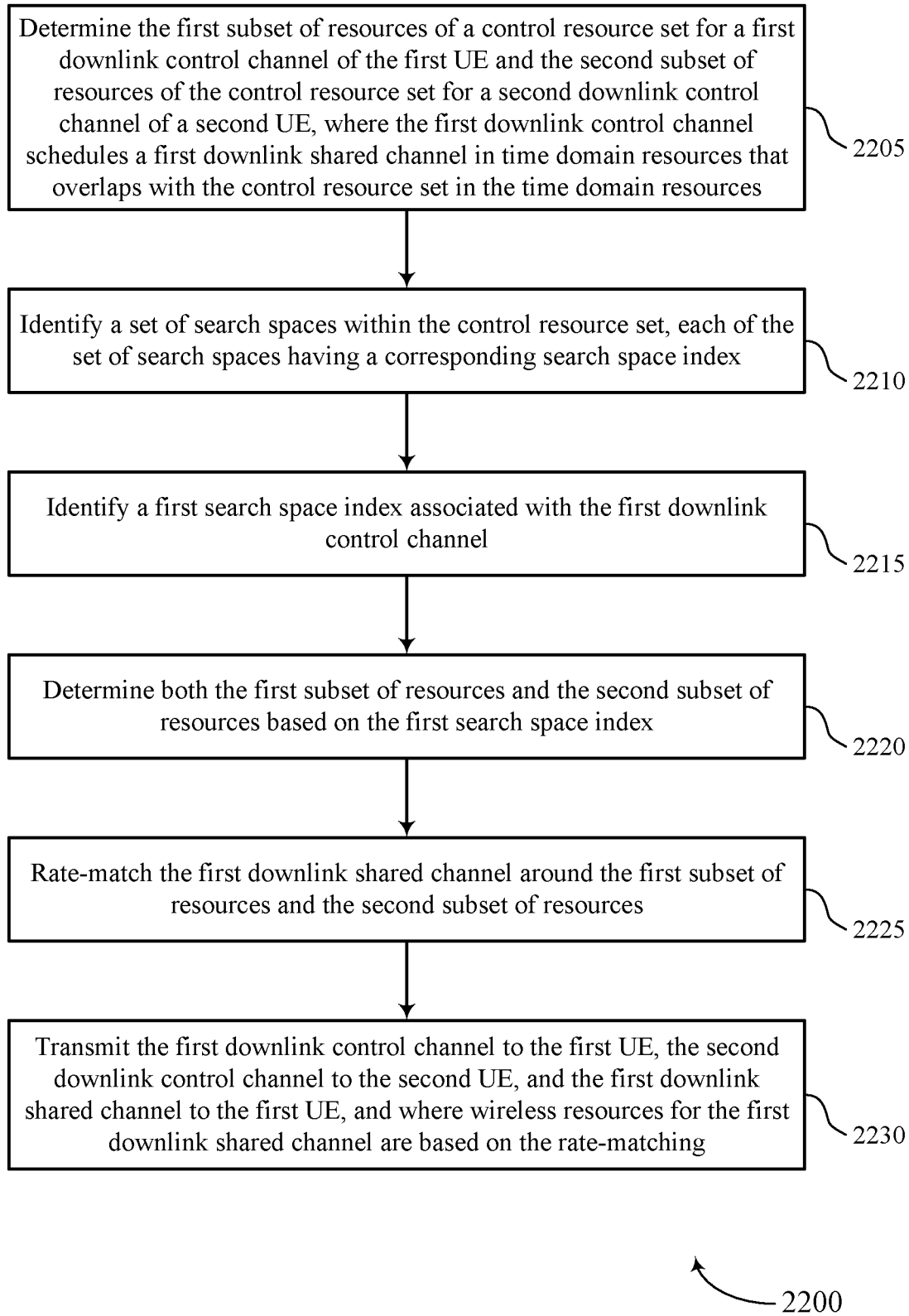

FIG. 22 shows a flowchart illustrating a method 2200 that supports rate-matching shared channel resources around control channels for multiple users in a control resource set in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources. The operations of 2205 may be performed according to the methods described herein. In some examples, aspects of the operations of 2205 may be performed by a CORESET manager as described with reference to FIGS. 13 through 16.

At 2210, the base station may identify a set of search spaces within the control resource set, each of the set of search spaces having a corresponding search space index. The operations of 2210 may be performed according to the methods described herein. In some examples, aspects of the operations of 2210 may be performed by a search space manager as described with reference to FIGS. 13 through 16.

At 2215, the base station may identify a first search space index associated with the first downlink control channel. The operations of 2215 may be performed according to the methods described herein. In some examples, aspects of the operations of 2215 may be performed by a search space manager as described with reference to FIGS. 13 through 16.

At 2220, the base station may determine both the first subset of resources and the second subset of resources based on the first search space index. The operations of 2220 may be performed according to the methods described herein. In some examples, aspects of the operations of 2220 may be performed by a search space manager as described with reference to FIGS. 13 through 16.

At 2225, the base station may rate-match the first downlink shared channel around the first subset of resources and the second subset of resources. The operations of 2225 may be performed according to the methods described herein. In some examples, aspects of the operations of 2225 may be performed by a rate-matching manager as described with reference to FIGS. 13 through 16.

At 2230, the base station may transmit the first downlink control channel to the first UE, the second downlink control channel to the second UE, and the first downlink shared channel to the first UE, and where wireless resources for the first downlink shared channel are based on the rate-matching. The operations of 2230 may be performed according to the methods described herein. In some examples, aspects of the operations of 2230 may be performed by a control channel manager as described with reference to FIGS. 13 through 16.

Figure 23:
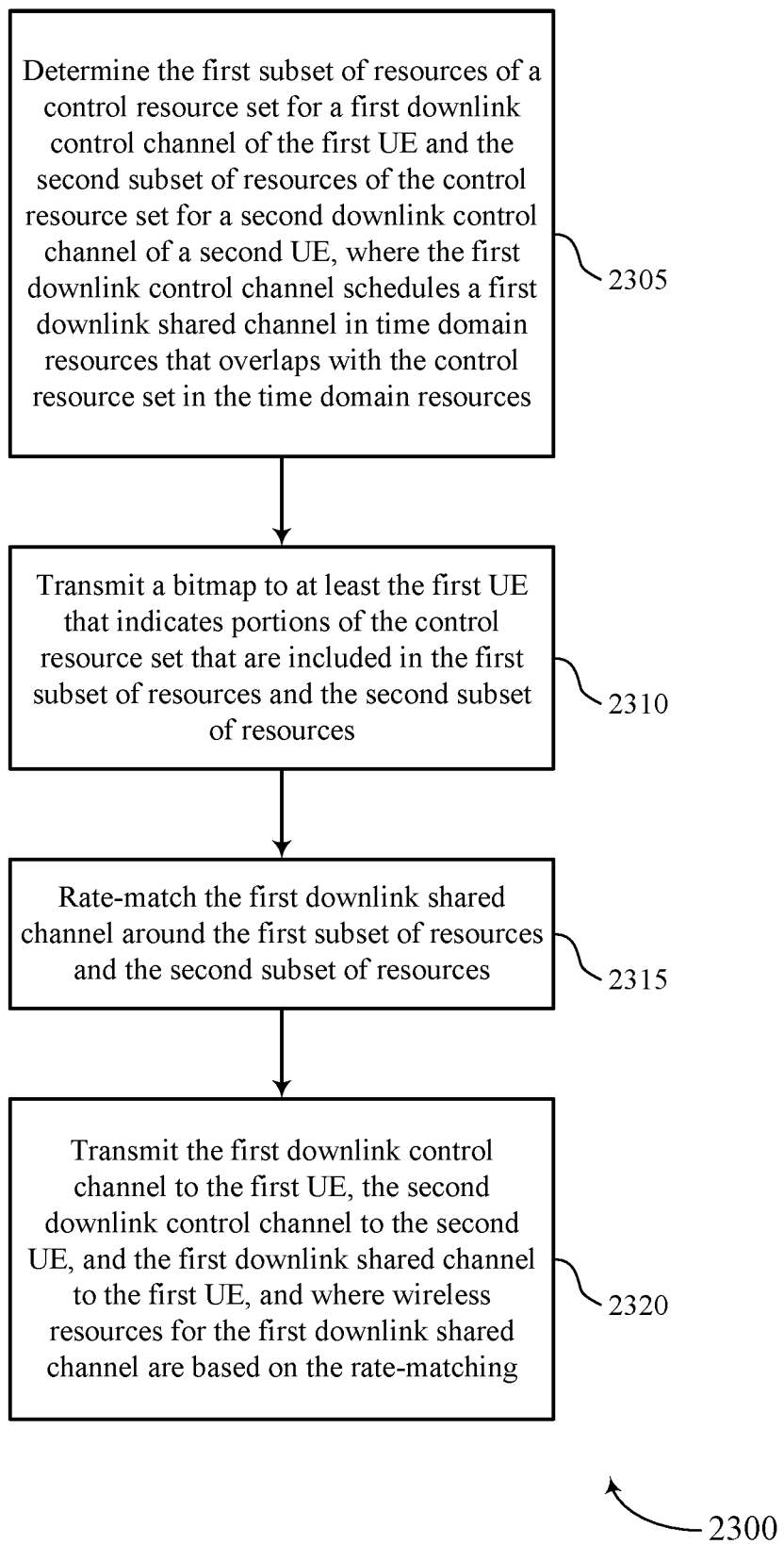

FIG. 23 shows a flowchart illustrating a method 2300 that supports rate-matching shared channel resources around control channels for multiple users in a control resource set in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may determine a first subset of resources of a control resource set for a first downlink control channel of a first UE and a second subset of resources of the control resource set for a second downlink control channel of a second UE, where the first downlink control channel schedules a first downlink shared channel in time domain resources that overlaps with the control resource set in the time domain resources. The operations of 2305 may be performed according to the methods described herein. In some examples, aspects of the operations of 2305 may be performed by a CORESET manager as described with reference to FIGS. 13 through 16.

At 2310, the base station may transmit a bitmap to at least the first UE that indicates portions of the control resource set that are included in the first subset of resources and the second subset of resources. The operations of 2310 may be performed according to the methods described herein. In some examples, aspects of the operations of 2310 may be performed by a control channel manager as described with reference to FIGS. 13 through 16.

At 2315, the base station may rate-match the first downlink shared channel around the first subset of resources and the second subset of resources. The operations of 2315 may be performed according to the methods described herein. In some examples, aspects of the operations of 2315 may be performed by a rate-matching manager as described with reference to FIGS. 13 through 16.

At 2320, the base station may transmit the first downlink control channel to the first UE, the second downlink control channel to the second UE, and the first downlink shared channel to the first UE, and where wireless resources for the first downlink shared channel are based on the rate-matching. The operations of 2320 may be performed according to the methods described herein. In some examples, aspects of the operations of 2320 may be performed by a control channel manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first UE, comprising: receiving a first downlink control channel on resources of a control resource set in time domain resources, wherein the first downlink control channel schedules a downlink shared channel in the time domain resources that overlaps with the resources of the control resource set in the time domain resources; determining, based at least in part on a location of the first downlink control channel within the resources of the control resource set, a subset of resources around which downlink shared channel rate matching is to be performed, wherein the subset of resources include the first downlink control channel and at least a second downlink control channel for at least a second UE that is different than the first UE; and processing the downlink shared channel based at least in part on the downlink shared channel rate matching.

Aspect 2: The method of aspect 1, wherein the determining comprises: identifying a plurality of search spaces within the control resource set, each of the plurality of search spaces having a corresponding search space index; identifying a first search space index associated with the first downlink control channel; and determining the subset of resources based at least in part on the first search space index.

Aspect 3: The method of aspect 2, wherein the subset of resources includes a subset of the plurality of search spaces that have a search space index that is equal to or lower than the first search space index.

Aspect 4: The method of any of aspects 1 through 3, wherein the first downlink control channel and the second downlink control channel have different aggregation levels.

Aspect 5: The method of aspect 4, wherein the determining further comprises: identifying a largest search space index of one or more search space indices of one or more downlink control channels for the first UE based on a lowest aggregation level of the different aggregation levels; and determining the subset of resources based at least in part on a number of search spaces having a lower search space index than the identified largest space index, and wherein the downlink shared channel is rate-matched around the subset of resources.

Aspect 6: The method of any of aspects 4 through 5, wherein the determining further comprises: identifying a largest search space index of a plurality of search space indices for each of two or more different aggregation levels based at least in part on an indication provided in the first downlink control channel; and determining the subset of resources based at least in part on a number of search spaces at each of the two or more different aggregation levels having a search space index at or below the indicated largest search space index of each of the two or more different aggregation levels, and wherein the downlink shared channel is rate-matched around the subset of resources.

Aspect 7: The method of any of aspects 1 through 6, wherein the determining further comprises: receiving a bitmap that indicates portions of the control resource set that are included in the subset of resources.

Aspect 8: The method of aspect 7, wherein the bitmap indicates resources that are available for the downlink shared channel or indicates resources that are unavailable for the downlink shared channel.

Aspect 9: The method of any of aspects 7 through 8, wherein a resolution of each bit of the bitmap is based at least in part on a lowest aggregation level used for downlink control channel transmissions.

Aspect 10: The method of any of aspects 7 through 9, wherein the bitmap omits resource locations of the first downlink control channel.

Aspect 11: The method of any of aspects 7 through 10, further comprising: receiving configuration information that indicates one or more locations in the resources of the control resource set that are unavailable for the downlink shared channel, and wherein the bitmap omits the indicated one or more locations.

Aspect 12: The method of any of aspects 7 through 11, wherein two or more different UEs are scheduled with downlink shared channels that overlap with the subset of resources, and wherein the bitmap is provided to each of the two or more different UEs for downlink shared channel rate-matching.

Aspect 13: The method of any of aspects 1 through 12, wherein the first downlink control channel includes an indication of whether one or more rate-matching information fields are provided to the first UE, and the determining and the processing are performed based at least in part on the indication.

Aspect 14: The method of any of aspects 1 through 13, further comprising: receiving, from a base station, configuration information that enables rate-matching around the subset of resources, or that disables rate-matching around the subset of resources.

Aspect 15: The method of any of aspects 1 through 14, wherein each of a plurality of search spaces within the control resource set is mapped to a set of control channel elements (CCEs), and wherein an index for each search space is based on a function of at least one of an aggregation level (AL), a CCE position of the search space within the control resource set, a time-based index, a UE index, a frequency-based index, or any combinations thereof.

Aspect 16: A method for wireless communication at a base station, comprising: determining a first subset of resources of a control resource set for a first downlink control channel of a first UE and a second subset of resources of the control resource set for a second downlink control channel of a second UE, wherein the first downlink control channel schedules a first downlink shared channel in time domain resources that overlaps with the control resource set in the time domain resources; rate-matching the first downlink shared channel around the first subset of resources and the second subset of resources; and transmitting the first downlink control channel to the first UE, the second downlink control channel to the second UE, and the first downlink shared channel to the first UE, and wherein wireless resources for the first downlink shared channel are based at least in part on the rate-matching.

Aspect 17: The method of aspect 16, wherein the determining comprises: identifying a plurality of search spaces within the control resource set, each of the plurality of search spaces having a corresponding search space index; identifying a first search space index associated with the first downlink control channel; and determining both the first subset of resources and the second subset of resources based at least in part on the first search space index.

Aspect 18: The method of aspect 17, wherein the second subset of resources is selected to have a second search space index that is lower than the first search space index.

Aspect 19: The method of any of aspects 17 through 18, wherein each of the plurality of search spaces have a same aggregation level.

Aspect 20: The method of any of aspects 16 through 19, wherein the first downlink control channel and the second downlink control channel have different aggregation levels.

Aspect 21: The method of aspect 20, wherein the determining further comprises: identifying a largest search space index of one or more search space indices of one or more downlink control channels for the first downlink control channel based on a lowest aggregation level of the different aggregation levels; and determining the second subset of resources based at least in part on a number of search spaces having a lower search space index than the identified largest space index.

Aspect 22: The method of any of aspects 20 through 21, further comprising: transmitting in indication of a largest search space index of a plurality of search space indices for each of two or more different aggregation levels to the first UE, and wherein the rate-matching is based at least in part on a number of search spaces at each of the two or more different aggregation levels having a search space index at or below the indicated largest search space index.

Aspect 23: The method of any of aspects 16 through 22, further comprising: transmitting a bitmap to at least the first UE that indicates portions of the control resource set that are included in the first subset of resources and the second subset of resources.

Aspect 24: The method of aspect 23, wherein the bitmap indicates resources that are available for the downlink shared channel or indicates resources that are unavailable for the downlink shared channel.

Aspect 25: The method of any of aspects 23 through 24, wherein a resolution of each bit of the bitmap is based at least in part on a lowest aggregation level used for downlink control channel transmissions.

Aspect 26: The method of any of aspects 23 through 25, wherein the bitmap omits resource locations of the first downlink control channel.

Aspect 27: The method of any of aspects 23 through 26, further comprising: transmitting configuration information to at least the first UE that indicates one or more locations in the resources of the control resource set that are unavailable for the downlink shared channel, and wherein the bitmap omits the indicated one or more locations.

Aspect 28: The method of any of aspects 23 through 27, wherein the first UE and the second UE are scheduled with downlink shared channels that overlap with the first subset of resources and the second subset of resources, and the bitmap is provided to each of the first UE and the second UE for downlink shared channel rate-matching.

Aspect 29: The method of any of aspects 16 through 28, wherein the first downlink control channel includes an indication of whether one or more rate-matching information fields are provided to the first UE, and the rate-matching is performed based at least in part on the indication.

Aspect 30: The method of any of aspects 16 through 29, further comprising: configuring the first UE to enable rate-matching around the first subset of resources and the second subset of resources, or to disable rate-matching around the first subset of resources and the second subset of resources.

Aspect 31: The method of any of aspects 16 through 30, wherein each of a plurality of search spaces within the control resource set is mapped to a set of control channel elements (CCEs), and wherein an index for each search space is based on a function of at least one of an aggregation level (AL), a CCE position of the search space within the control resource set, a time-based index, a UE index, a frequency-based index, or any combinations thereof.

Aspect 32: An apparatus for wireless communication at a first UE, comprising a processor; memory coupled with the processor; and instructions stored in the memory and executable by the processor to cause the apparatus to perform a method of any of aspects 1 through 15.

Aspect 33: An apparatus for wireless communication at a first UE, comprising at least one means for performing a method of any of aspects 1 through 15.

Aspect 34: A non-transitory computer-readable medium storing code for wireless communication at a first UE, the code comprising instructions executable by a processor to perform a method of any of aspects 1 through 15.

Aspect 35: An apparatus for wireless communication at a base station, comprising a processor; memory coupled with the processor; and instructions stored in the memory and executable by the processor to cause the apparatus to perform a method of any of aspects 16 through 31.

Aspect 36: An apparatus for wireless communication at a base station, comprising at least one means for performing a method of any of aspects 16 through 31.

Aspect 37: A non-transitory computer-readable medium storing code for wireless communication at a base station, the code comprising instructions executable by a processor to perform a method of any of aspects 16 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first user equipment (UE), comprising:
at least one memory; and
at least one processor coupled to the at least one memory, wherein the at least one processor is configured to cause the first UE to:
receive a first downlink control channel on resources of a control resource set in time domain resources, wherein the first downlink control channel schedules a downlink shared channel in the time domain resources that overlaps with the resources of the control resource set in the time domain resources, and wherein the control resource set includes a plurality of locations for a plurality of different downlink control channels;
determine, based on a first location of the first downlink control channel within the plurality of locations of the control resource set, a subset of resources within the control resource set around which downlink shared channel rate matching is to be performed, wherein the subset of resources includes resources for the first downlink control channel and at least a second downlink control channel for at least a second UE that is different than the first UE, and wherein a second location of the second downlink control channel within the plurality of locations of the control resource set is based on the first location of the first downlink control channel within the plurality of locations of the control resource set; and
process the downlink shared channel based on the downlink shared channel rate matching.

2. The first UE of claim 1, wherein to determine the subset of resources within the control resource set around which downlink shared channel rate matching is to be performed, the at least one processor is configured to cause the first UE to:
identify a plurality of search spaces within the control resource set, each of the plurality of search spaces having a corresponding search space index that indicates a corresponding location within the plurality of locations of the control resource set;
identify a first search space index associated with the first downlink control channel; and
determine the subset of resources based on the first search space index.

3. The first UE of claim 2, wherein the subset of resources includes a subset of the plurality of search spaces that have a search space index that is equal to or lower than the first search space index.

4. The first UE of claim 1, wherein the first downlink control channel and the second downlink control channel have different aggregation levels.

5. The first UE of claim 4, wherein to determine the subset of resources within the control resource set around which downlink shared channel rate matching is to be performed, the at least one processor is configured to cause the first UE to:
identify a largest search space index of one or more search space indices of one or more downlink control channels for the first UE based on a lowest aggregation level of the different aggregation levels; and
determine the subset of resources based on a number of search spaces having a lower search space index than the identified largest space index, and wherein the downlink shared channel is rate-matched around the subset of resources.

6. The first UE of claim 4, wherein to determine the subset of resources within the control resource set around which downlink shared channel rate matching is to be performed, the at least one processor is configured to cause the first UE to:
identify a largest search space index of a plurality of search space indices for each of two or more different aggregation levels based on an indication provided in the first downlink control channel; and
determine the subset of resources based on a number of search spaces at each of the two or more different aggregation levels having a search space index at or below the indicated largest search space index of each of the two or more different aggregation levels, and wherein the downlink shared channel is rate-matched around the subset of resources.

7. The first UE of claim 1, wherein to determine the subset of resources within the control resource set around which downlink shared channel rate matching is to be performed, the at least one processor is configured to cause the first UE to:
receive a bitmap that indicates portions of the control resource set that are included in the subset of resources.

8. The first UE of claim 7, wherein the bitmap indicates resources that are available for the downlink shared channel or indicates resources that are unavailable for the downlink shared channel.

9. The first UE of claim 7, wherein a resolution of each bit of the bitmap is based on a lowest aggregation level used for downlink control channel transmissions.

10. The first UE of claim 7, wherein the bitmap omits resource locations of the first downlink control channel.

11. The first UE of claim 7, wherein to determine the subset of resources within the control resource set around which downlink shared channel rate matching is to be performed, the at least one processor is configured to cause the first UE to:
receive configuration information that indicates one or more locations in the resources of the control resource set that are unavailable for the downlink shared channel, and wherein the bitmap omits the indicated one or more locations.

12. The first UE of claim 7, wherein:
two or more different UEs are scheduled with downlink shared channels that overlap with the subset of resources, and wherein the bitmap is provided to each of the two or more different UEs for downlink shared channel rate-matching.

13. The first UE of claim 1, wherein the first downlink control channel includes an indication of whether one or more rate-matching information fields are provided to the first UE, and wherein the determination and the processing are performed based on the indication.

14. The first UE of claim 1, wherein to determine the subset of resources within the control resource set around which downlink shared channel rate matching is to be performed, the at least one processor is configured to cause the first UE to:
receive, from a base station, configuration information that enables rate-matching around the subset of resources, or that disables rate-matching around the subset of resources.

15. The first UE of claim 1, wherein each of a plurality of search spaces within the control resource set is mapped to a set of control channel elements (CCEs), and wherein an index for each search space is based on a function of at least one of: an aggregation level (AL), a CCE position of the search space within the control resource set, a time-based index, a UE index, a frequency-based index, or any combinations thereof.

16. A network entity for wireless communication, comprising:
at least one memory; and
at least one processor coupled to the at least one memory, wherein the at least one processor is configured to cause the network entity to:
determine a first subset of resources of a control resource set for a first downlink control channel of a first user equipment (UE) and a second subset of resources of the control resource set for a second downlink control channel of a second UE, wherein the first downlink control channel schedules a first downlink shared channel in time domain resources that overlap with the control resource set, and wherein the control resource set includes a plurality of locations associated with different subsets of resources for a plurality of different downlink control channels, and a first location of the first subset of resources within the plurality of locations of the control resource set indicates a second location of the second subset of resources within the plurality of locations of the control resource set;
rate-match the first downlink shared channel around the first subset of resources and the second subset of resources; and
transmit the first downlink control channel to the first UE, the second downlink control channel to the second UE, and the first downlink shared channel to the first UE, and wherein wireless resources for the first downlink shared channel are based on the rate-match of the first downlink shared channel around the first subset of resources and the second subset of resources.

17. The network entity of claim 16, wherein to determine the first subset of resources and the second subset of resources within the control resource set, the at least one processor is configured to cause the network entity to:
identify a plurality of search spaces within the control resource set, each of the plurality of search spaces having a corresponding search space index that indicates a location within the plurality of locations of the control resource set;
identify a first search space index associated with the first downlink control channel; and
determine both the first subset of resources and the second subset of resources based on the first search space index.

18. The network entity of claim 17, wherein the second subset of resources is selected to have a second search space index that is lower than the first search space index.

19. The network entity of claim 17, wherein each of the plurality of search spaces have a same aggregation level.

20. The network entity of claim 16, wherein the first downlink control channel and the second downlink control channel have different aggregation levels.

21. The network entity of claim 20, wherein to determine the first subset of resources and the second subset of resources within the control resource set, the at least one processor is configured to cause the network entity to:
identify a largest search space index of one or more search space indices of one or more downlink control channels for the first downlink control channel based on a lowest aggregation level of the different aggregation levels; and
determine the second subset of resources based on a number of search spaces having a lower search space index than the identified largest space index.

22. The network entity of claim 16, wherein to determine the first subset of resources and the second subset of resources within the control resource set, the at least one processor is configured to cause the network entity to:
transmit a bitmap to at least the first UE that indicates portions of the control resource set that are included in the first subset of resources and the second subset of resources.

23. The network entity of claim 16, wherein to determine the first subset of resources and the second subset of resources within the control resource set, the at least one processor is configured to cause the network entity to:
configure the first UE to enable rate-matching around the first subset of resources and the second subset of resources, or to disable rate-matching around the first subset of resources and the second subset of resources.

24. A method for wireless communication at a first user equipment (UE), comprising:
receiving a first downlink control channel on resources of a control resource set in time domain resources, wherein the first downlink control channel schedules a downlink shared channel in the time domain resources that overlaps with the resources of the control resource set in the time domain resources, and wherein the control resource set includes a plurality of locations for a plurality of different downlink control channels;
determining, based on a first location of the first downlink control channel within the plurality of locations of the control resource set, a subset of resources within the control resource set around which downlink shared channel rate matching is to be performed, wherein the subset of resources includes resources for the first downlink control channel and at least a second downlink control channel for at least a second UE that is different than the first UE, and wherein a second location of the second downlink control channel within the plurality of locations of the control resource set is based on the first location of the first downlink control channel within the plurality of locations of the control resource set; and
processing the downlink shared channel based on the downlink shared channel rate matching.

25. The method of claim 24, wherein the determining comprises:
identifying a plurality of search spaces within the control resource set, each of the plurality of search spaces having a corresponding search space index that indicates a location within the plurality of locations of the control resource set;
identifying a first search space index associated with the first downlink control channel; and
determining the subset of resources based on the first search space index.

26. The method of claim 24, wherein the determining further comprises:
receiving a bitmap that indicates portions of the control resource set that are included in the subset of resources.

27. The method of claim 24, wherein the first downlink control channel includes an indication of whether one or more rate-matching information fields are provided to the first UE, and wherein the determining and the processing are performed based on the indication.

28. A method for wireless communication at a network entity, comprising:

determining a first subset of resources of a control resource set for a first downlink control channel of a first user equipment (UE) and a second subset of resources of the control resource set for a second downlink control channel of a second UE, wherein the first downlink control channel schedules a first downlink shared channel in time domain resources that overlap with the control resource set, and wherein the control resource set includes a plurality of locations associated with different subsets of resources for a plurality of different downlink control channels, and a first location of the first subset of resources within the plurality of locations of the control resource set indicates a second location of the second subset of resources within the plurality of locations of the control resource set;

rate-matching the first downlink shared channel around the first subset of resources and the second subset of resources; and transmitting the first downlink control channel to the first UE, the second downlink control channel to the second UE, and the first downlink shared channel to the first UE, and wherein wireless resources for the first downlink shared channel are based on the rate-matching.

29. The method of claim 28, wherein the determining comprises:

identifying a plurality of search spaces within the control resource set, each of the plurality of search spaces having a corresponding search space index that indicates a location within the plurality of locations of the control resource set;

identifying a first search space index associated with the first downlink control channel; and determining both the first subset of resources and the second subset of resources based on the first search space index.

30. The method of claim 28, further comprising:

transmitting a bitmap to at least the first UE that indicates portions of the control resource set that are included in the first subset of resources and the second subset of resources.

* * * * *